United States Patent
Yamashita et al.

(10) Patent No.: US 7,226,498 B2
(45) Date of Patent: Jun. 5, 2007

(54) INK JET YELLOW INK, INK JET LIGHT-COLOR INK, INK SET, INK JET RECORDING METHOD, INK CARTRIDGE, RECORDING UNIT, AND INK JET RECORDING APPARATUS

(75) Inventors: Tomohiro Yamashita, Kawasaki (JP); Shin-ichi Sato, Kawasaki (JP); Jun Yoshizawa, Tokyo (JP); Kunihiko Nakamura, Gotenba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/342,547
(22) Filed: Jan. 31, 2006
(65) Prior Publication Data
US 2006/0119685 A1 Jun. 8, 2006

Related U.S. Application Data

(63) Continuation of application No. PCT/JP05/14614, filed on Aug. 3, 2005.

(30) Foreign Application Priority Data

Aug. 4, 2004 (JP) .............................. 2004-228229
Aug. 2, 2005 (JP) .............................. 2005-224242

(51) Int. Cl.
*C09D 11/02* (2006.01)
*B41J 2/01* (2006.01)
(52) U.S. Cl. ............... 106/31.5; 106/31.78; 106/31.79; 347/100
(58) Field of Classification Search ............... 106/31.5, 106/31.78, 31.79; 534/691; 347/100
See application file for complete search history.

(56) References Cited

U.S. PATENT DOCUMENTS 2,232,078 A * 2/1941 Schindhelm ................. 534/691

(Continued)

FOREIGN PATENT DOCUMENTS

EP 1669413 * 6/2006

(Continued)

OTHER PUBLICATIONS

Dialog abstract of WO 2005/033211, Apr. 2005.*

*Primary Examiner*—Helene Klemanski
(74) *Attorney, Agent, or Firm*—Fitzpatrick, Cella, Harper & Scinto

(57) ABSTRACT

To provide an ink jet yellow ink having a favorable color tone and capable of providing an image excellent in humidity resistance. The ink jet yellow ink of the present invention is an ink jet yellow ink to be used in combination with an ink jet light-color ink comprising at least a coloring material and a water-soluble organic solvent, wherein the coloring material of the ink jet yellow ink is a compound represented by the following General Formula (I) or a salt thereof, and wherein the ink jet light-color ink satisfies a specific condition;

General Formula (I):

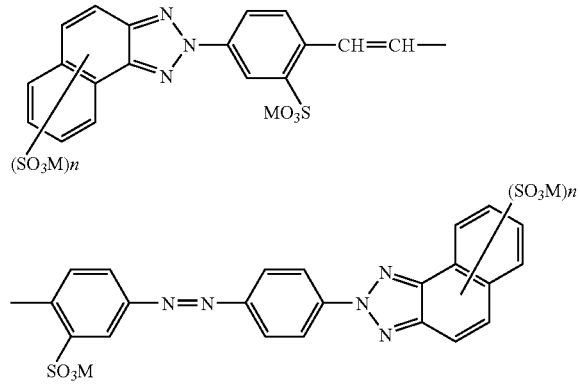

wherein M's each independently represent a hydrogen atom, an alkali metal, an alkali earth metal, a cation of organic amine or an ammonium ion, and n's each independently represent 1 or 2; and $Y \leq 2.8X + 10$.          Expression (1)

21 Claims, 7 Drawing Sheets

U.S. PATENT DOCUMENTS

| | | | | |
|---|---|---|---|---|
| 3,310,551 A * | 3/1967 | Mcleod | ...................... | 534/691 |
| 3,575,954 A * | 4/1971 | Jirou et al. | ................. | 534/691 |
| 3,578,653 A * | 5/1971 | Wallace | ...................... | 534/691 |
| 4,202,870 A | 5/1980 | Weber et al. | ................ | 423/630 |
| 4,242,271 A | 12/1980 | Weber et al. | ......... | 260/448 AD |
| 4,723,129 A | 2/1988 | Endo et al. | ................... | 346/1.1 |
| 4,740,796 A | 4/1988 | Endo et al. | ................... | 346/1.1 |
| 5,091,009 A | 2/1992 | Nogami et al. | .......... | 106/287.1 |
| 5,221,497 A | 6/1993 | Watanabe et al. | ........ | 252/313.2 |
| 5,395,434 A | 3/1995 | Tochihara et al. | ........ | 106/22 R |
| 5,415,686 A | 5/1995 | Kurabayashi et al. | ..... | 106/26 R |
| 5,451,251 A | 9/1995 | Mafune et al. | ........... | 106/22 H |
| 5,482,545 A | 1/1996 | Aoki et al. | ................ | 106/22 K |
| 5,485,188 A | 1/1996 | Tochihara et al. | ........ | 347/100 |
| 5,835,116 A | 11/1998 | Sato et al. | .................... | 347/98 |
| 5,868,822 A | 2/1999 | Yui et al. | ................ | 106/31.26 |
| 5,933,164 A | 8/1999 | Sato et al. | .................... | 347/43 |
| 6,003,987 A | 12/1999 | Yamamoto et al. | ......... | 347/100 |
| 6,027,210 A | 2/2000 | Kurabayashi et al. | ....... | 347/100 |
| 6,186,615 B1 | 2/2001 | Sato et al. | .................... | 347/43 |
| 6,238,045 B1 | 5/2001 | Ono et al. | ................ | 347/96 |
| 6,322,209 B1 | 11/2001 | Sato et al. | .................. | 347/105 |
| 6,511,534 B1 | 1/2003 | Mishina et al. | .......... | 106/31.33 |
| 6,698,876 B2 | 3/2004 | Sato et al. | .................. | 347/100 |
| 6,824,263 B2 | 11/2004 | Taniguchi et al. | .......... | 347/100 |
| 6,976,755 B2 | 12/2005 | Sato et al. | .................. | 347/100 |
| 7,056,374 B2 * | 6/2006 | Kitayama et al. | ........ | 106/31.46 |
| 7,144,452 B2 | 12/2006 | Takayama et al. | ........ | 106/31.52 |
| 2004/0099180 A1 | 5/2004 | Kitayama et al. | ........ | 106/31.46 |
| 2005/0005818 A1 | 1/2005 | Sato et al. | ................. | 106/31.27 |
| 2005/0131104 A1 | 6/2005 | Aikawa et al. | ............. | 523/160 |
| 2006/0102046 A1 | 5/2006 | Okamura et al. | ........ | 106/31.47 |
| 2006/0102047 A1 | 5/2006 | Yoshizawa et al. | ...... | 106/31.47 |
| 2006/0102048 A1 | 5/2006 | Nakamura et al. | ...... | 106/31.52 |
| 2006/0103705 A1 | 5/2006 | Yoshizawa et al. | ......... | 347/100 |
| 2006/0103706 A1 | 5/2006 | Aikawa et al. | ............. | 347/100 |
| 2006/0119683 A1 | 6/2006 | Yoshizawa et al. | ......... | 347/100 |
| 2006/0119685 A1 | 6/2006 | Yamashita et al. | .......... | 347/100 |
| 2006/0124027 A1 | 6/2006 | Sato | ......................... | 106/31.6 |
| 2006/0139429 A1 * | 6/2006 | Osumi et al. | .............. | 406/31.5 |
| 2006/0146108 A1 | 7/2006 | Sato et al. | .................. | 347/100 |
| 2006/0152569 A1 | 7/2006 | Jinnou et al. | ................ | 347/105 |

FOREIGN PATENT DOCUMENTS

| | | |
|---|---|---|
| JP | 57-44605 B2 | 9/1982 |
| JP | 9-111164 | 4/1997 |
| JP | 2803134 B2 | 9/1998 |
| JP | 2881847 B2 | 4/1999 |
| JP | 2000-319560 | 11/2000 |
| JP | 2003-113334 | 4/2003 |
| JP | 2003-285539 | 10/2003 |
| JP | 2003-321627 | 11/2003 |
| WO | WO 2005/033211 * | 4/2005 |

* cited by examiner

INK JET YELLOW INK, INK JET LIGHT-COLOR INK, INK SET, INK JET RECORDING METHOD, INK CARTRIDGE, RECORDING UNIT, AND INK JET RECORDING APPARATUS

This application is a continuation of International Application No. PCT/JP2005/014614 filed on Aug. 3, 2005, which claims the benefit of Japanese Patent Application No. 2004-228229 filed on Aug. 4, 2004, and Japanese Patent Application No. 2005-224242 filed on Aug. 2, 2005.

BACKGROUND OF THE INVENTION

1. Field of the Invention

The present invention relates to an ink jet yellow ink, an ink jet light-color ink, an ink set, an ink jet recording method, an ink cartridge, a recording unit, and an ink jet recording apparatus each of which is capable of providing an image excellent in humidity resistance.

2. Relates Background Art

An ink jet recording method is a recording method involving applying small ink droplets to any one of recording media such as plain paper and glossy media to form an image, and has become rapidly widespread owing to a reduction in its cost and an improvement in its recording rate. With the rapid spread of a digital camera in addition to an improvement in quality of an image recorded by the method, the method has been generally used as a method of outputting a photographic image comparable to silver halide photographs.

In recent years, the storage stability of an image has been requested for an ink jet recording method. In particular, humidity resistance which is the stability of an image in an environment having a high humidity is an important element in terms of storage stability of the image, so investigation has been made into ink capable of proving an image excellent in humidity resistance. For example, there has been proposed light-color ink out of inks having a color in the same family and different from each other in a tone, the light-color ink containing a hydrophilic and low-volatile organic solvent prepared by mixing a hydrophilic and low-volatile organic solvent having a vapor pressure of 1 Pa or less and a hydrophilic and low-volatile organic solvent having a vapor pressure of 1 to 10 Pa (see, for example, Japanese Patent Application Laid-Open No. 2000-319560).

Meanwhile, there has been proposed a technique for synthesizing a novel coloring material which: is excellent in humidity resistance, light resistance, and water resistance; is suitable for ink jet recording; and provides a good hue and good visibility (see, for example, Japanese Patent Application Laid-Open No. 2003-321627).

SUMMARY OF THE INVENTION

The inventors of the present invention have made extensive studies. As a result, they have found the following. In the case where one kind of ink is used to form an image, even if the ink is capable of providing an image excellent in humidity resistance, when the ink is used in combination with any other ink to form an image (for example, to form secondary and tertiary colors), the humidity resistance of an image to be obtained may deteriorate depending on the composition of a component constituting the other ink.

In particular, in recent years, when creating a recorded article having a photograph-quality picture, so-called light-color ink having a coloring material concentration of 0.1 mass % or more and 2.0 mass % or less has been widely used for the purpose of improving mainly the gradation representation performance of an image. The inventors of the present invention have confirmed that the composition of light-color ink influences the humidity resistance of an image when the light-color ink is used in combination with any other ink to form the image.

A light-color ink has a low coloring material concentration and has a low viscosity. Therefore, the light-color ink often contains a water-soluble organic solvent in its composition so that the light-color ink has a viscosity comparable to that of any other ink to be used in combination with the light-color ink. Furthermore, the light-color ink has a low coloring material concentration, so the amount of the light-color ink to be applied to a recording medium tends to be larger than that of deep-color ink to be applied thereto. The foregoing shows that there is a certain relation between a water-soluble organic solvent and the deterioration of humidity resistance of an image to be obtained.

A water-soluble organic solvent in ink permeates into a recorded article created by applying the ink to a recording medium. That is, the water-soluble organic solvent in the recorded article is derived from the composition of a water-soluble organic solvent in light-color ink at a large ratio. On the basis of the foregoing, the inventors have found a new problem in that the humidity resistance of an image deteriorates when a deep-color ink having a coloring material concentration in excess of 2.0 mass % is used in combination with a light-color ink having a coloring material concentration of 0.1 mass % or more and 2.0 mass % or less, although such problem does not occur when only the deep-color ink is used to form an image. As described above, the humidity resistance of an image is adversely affected by a solvent in a recorded article. Accordingly, a reduction in content of a water-soluble organic solvent in ink may improve the humidity resistance of an image.

However, as a result of extensive studies made by the inventors of the present invention, it has been found that the content of a water-soluble organic solvent in ink does not simply correlate with the humidity resistance of an image in some cases. As a result of further studies, the inventors have found that the humidity resistance of an image is closely related to the moisture absorption property (moisture absorption rate) of a water-soluble organic solvent in ink in addition to the volatility (evaporation rate) of the water-soluble organic solvent. In other words, it is insufficient to design ink only in terms of the volatility (evaporation rate) of a water-soluble organic solvent in the ink in order to improve the humidity resistance of an image, so ink must be designed while the moisture absorption property (moisture absorption rate) of the water-soluble organic solvent is also taken into consideration.

At the same time, when a water-soluble organic solvent having high volatility is used to design ink, reliability requested for ink jet ink such as start-up ejection stability must be satisfied.

Meanwhile, in recent years, there has been growing demand for the storage stability of an image, so an increased level of humidity resistance of the image has been requested. Therefore, it has been requested to maximize the utilization of the performance of a coloring material having a favorable color tone (hue) and favorable visibility and excellent in light resistance and water resistance to provide an additionally increased level of humidity resistance.

Therefore, an object of the present invention is to provide an ink jet yellow ink having a favorable color tone and capable of providing an image excellent in humidity resistance.

Another object of the present invention is to provide an ink jet light-color ink to be used in combination with the yellow ink, the ink jet light-color ink being capable of providing an image excellent in humidity resistance and gradation representation performance.

Another object of the present invention is to provide an ink set, an ink cartridge, an ink jet recording method, and an ink jet recording apparatus each using the ink jet yellow ink or the ink jet light-color ink.

The above objects are achieved by the present invention described below. That is, according to one aspect of the present invention, there is provided an ink jet yellow ink to be used in combination with an ink jet light-color ink comprising at least a coloring material and water-soluble organic solvent(s), wherein a coloring material of the ink jet yellow ink containing a compound represented by the following general formula (I) or a salt thereof; and wherein the ink jet light-color ink satisfies the following conditions (i) and (ii):

(i) a content (mass %) of the coloring material in the ink jet light-color ink is 0.1 mass % or more and 2.0 mass % or less with respect to the total mass of the ink jet light-color ink, and (ii) a total content (mass %) of water-soluble organic solvent(s) each having an evaporation rate X (mass %) and a moisture absorption rate Y (mass %) which satisfy a relationship represented by the following expression (1) is 50 mass % or more with respect to the total content (mass %) of water-soluble organic solvent(s) in the ink jet light-color ink;

General Formula (I):

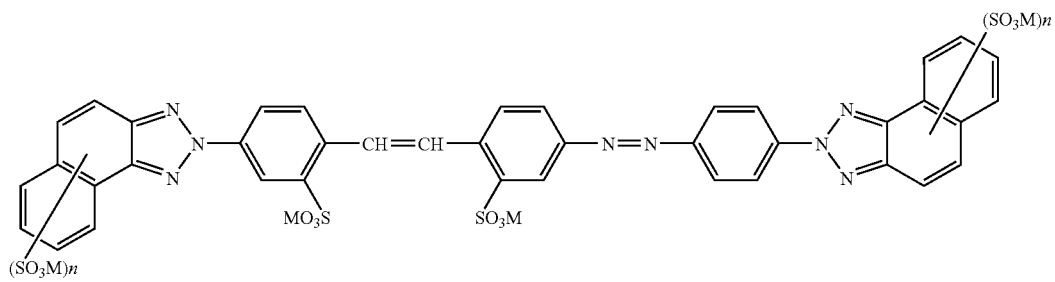

wherein M's each independently represent a hydrogen atom, an alkali metal, an alkali earth metal, a cation of organic amine or an ammonium ion, and n's each independently represent 1 or 2; and $$Y \leq 2.8X + 10 \qquad \text{Expression (1).}$$

According to another aspect of the present invention, there is provided an ink jet light-color ink comprising at least a coloring material and water-soluble organic solvent(s), wherein the ink jet light-color ink satisfies the following conditions (i) and (ii), and the ink jet light-color ink is used in combination with an ink jet yellow ink comprising a compound represented by the following general formula (I) or a salt thereof as a coloring material;

(i) a content (mass %) of the coloring material in the ink jet light-color ink is 0.1 mass % or more and 2.0 mass % or less with respect to the total mass of the ink jet light-color ink, and (ii) a total content (mass %) of water-soluble organic solvent(s) each having an evaporation rate X (mass %) and a moisture absorption rate Y (mass %) which satisfy a relationship represented by the following expression (1): $Y \leq 2.8X + 10$ is 50 mass % or more with respect to the total content (mass %) of the water-soluble organic solvent(s) in the ink jet light-color ink, General Formula (I):

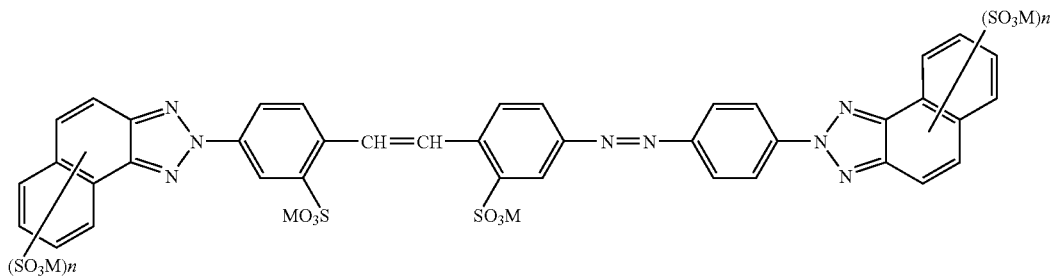

wherein M's each independently represent a hydrogen atom, an alkali metal, an alkali earth metal, a cation of organic amine or an ammonium ion, and n's each independently represent 1 or 2; and $Y \leq 2.8X+10$     Expression (1).

According to another aspect of the present invention, there is provided an ink set composed of a plurality of inks, comprising at least an ink jet yellow ink and an ink jet light-color ink, wherein the ink jet yellow ink comprises at least a coloring material and water-soluble organic solvent(s), the coloring material of the ink jet yellow ink is a compound represented by the following general formula (I) or a salt thereof, the ink jet light-color ink comprises at least a coloring material and a water-soluble organic solvent, and the ink jet light-color ink satisfies the following conditions (i) and (ii):

(i) a content (mass %) of the coloring material in the ink jet light-color ink is 0.1 mass % or more and 2.0 mass % or less with respect to a total mass of the ink jet light-color ink, and (ii) a total content (mass %) of a water-soluble organic solvent having an evaporation rate X (mass %) and a moisture absorption rate Y (mass %) which satisfy a relationship represented by the following expression (1) is 50 mass % or more with respect to a total content (mass %) of a water-soluble organic solvent in the ink jet light-color ink;

wherein M's each independently represent a hydrogen atom, an alkali metal, an alkali earth metal, a cation of organic amine or an ammonium ion, and n's each independently represent 1 or 2; and $Y \leq 2.8X+10$     Expression (1).

According to another aspect of the present invention, there is provided an ink jet recording method including ejecting an ink by ink jet method, wherein the ink is the ink jet yellow ink or the ink jet light-color ink having the above-described constitution.

According to another aspect of the present invention, there is provided an ink cartridge including an ink storage portion for storing an ink, wherein the ink is the ink jet yellow ink or the ink jet light-color ink having the above-described constitution.

According to another aspect of the present invention, there is provided a recording unit including an ink storage portion for storing an ink and a recording head for ejecting the ink, wherein the ink is the ink jet yellow ink or the ink jet light-color ink having the above-described constitution.

According to another aspect of the present invention, there is provided an ink jet recording apparatus including an ink storage portion for storing an ink and a recording head for ejecting the ink, wherein the ink is the ink jet yellow ink or the ink jet light-color ink having the above-described constitution.

General Formula (I):

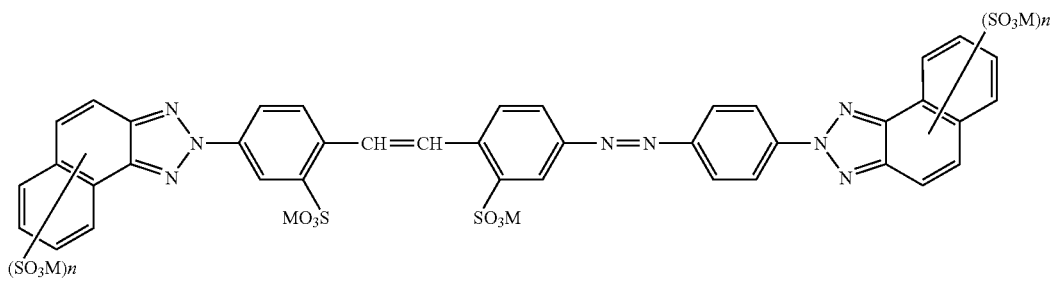

According to the present invention, there is provided an ink jet yellow ink having a favorable color tone and capable of providing an image excellent in humidity resistance.

According to another aspect of the present invention, there is provided an ink jet light-color ink to be used in combination with the ink jet yellow ink, the ink jet light-color ink being capable of providing an image excellent in humidity resistance and gradation representation performance.

According to another aspects of the present invention, there are provided an ink set, an ink jet recording method, an ink cartridge, a recording unit, and an ink jet recording apparatus each using the ink jet yellow ink or the ink jet light-color ink.

DESCRIPTION OF THE PREFERRED EMBODIMENTS

Hereinafter, the present invention will be described in more detail by way of preferred embodiments.

In the present invention, when a compound is a salt, the salt is dissociated to ions in ink, but this state is represented by using the phrase "contains a salt" for convenience.

<Ink>

Hereinafter, components constituting the ink according to the present invention and the like will be described in detail.

(Water-soluble Organic Solvent and Water)

Water-soluble organic solvents for ink jet light-color ink to be used in combination with the yellow ink of the present invention must satisfy a condition that the total content (mass %) of water-soluble organic solvents in each of which an evaporation rate X (mass %) and a moisture absorption rate Y (mass %) satisfy a relationship represented by the following Expression (1) is 50 mass % or more with respect to the total content (mass %) of the water-soluble organic solvents in the ink jet light-color ink.

$$Y \leq 2.8X + 10 \quad \text{Expression (1)}$$

Figure 1:
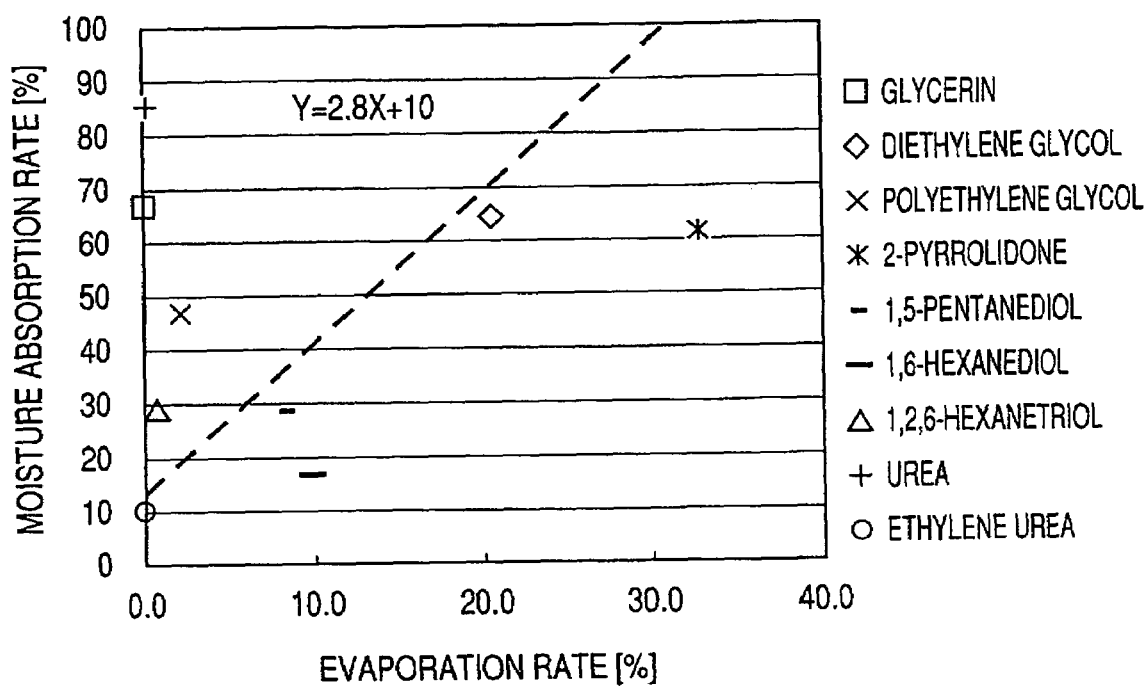
FIG. 1 is a graph showing a relationship between an evaporation rate and a moisture absorption rate in the present invention.

The evaporation rate X (mass %) in the present invention is determined by: placing 5 g of a water-soluble organic solvent into a dish having an outer diameter of 31 mm and a height of 15 mm; leaving the dish to stand still in an environment having a temperature of 60° C. and a humidity of 10% for 192 hours; measuring the mass of the water-soluble organic solvent again; and determining the evaporation rate from the reduced mass of the water-soluble organic solvent. The moisture absorption rate Y (mass %) is determined by: placing 5 g of a water-soluble organic solvent into a dish having an outer diameter of 31 mm and a height of 15 mm; leaving the dish to stand still in an environment having a temperature of 30° C. and a humidity of 80% for 192 hours; measuring the mass of the water-soluble organic solvent again; and determining the moisture absorptivity from the increased mass of the water-soluble organic solvent. FIG. 1 is a graph showing a relationship between the evaporation rate and moisture absorption rate of each water-soluble organic solvent calculated by means of the above methods.

Ink containing the above water-soluble organic solvents was prepared, and the following experiment was conducted. Model ink was prepared, which contained 3 mass % of C.I. Direct Yellow 132 as a coloring material, 20 mass % of each water-soluble organic solvent, and 0.5 mass % of Acetylenol E-100 (manufactured by Kawaken Fine Chemicals Co., Ltd.) as a surfactant, the balance being water. Clear ink was prepared separately from the model ink by replacing the coloring material of the model ink with water. A recorded article was created, on which an image had been formed by: changing each of the resultant model ink and clear ink in the duty range of 0 to 100%; and superimposing them. A PIXUS 950i (manufactured by CANON Inc.) to serve as an ink jet printer and super photopaper (SP-101; manufactured by CANON Inc.) to serve as a recording medium were used for creating the recorded article.

The resultant recorded article was left in an environment having a temperature of 25° C. and a humidity of 60% (an ordinary-temperature-and-ordinary-humidity environment) for 48 hours to evaporate the water-soluble organic solvents and water from the recording medium. When the recorded article is left for shorter than 48 hours, the amounts of the water-soluble organic solvents and water remaining on the recording medium does not become constant, so the evaluation results may not become stable. A color tone after leaving in the environment having a temperature of 25° C. and a humidity of 60% for 48 hours was measured by means of a spectrophotometer (trade name: Spectrolino; manufactured by Gretag Macbeth) to determine an La*b* value. After that, the recorded article was left in an environment having a temperature of 30° C. and a humidity of 80% (a high-temperature-and-high-humidity environment) for 96 hours or longer to cause the water-soluble organic solvents to migrate. Setting the time period during which the recorded article is left to be equal to or longer than 96 hours facilitates the comparison between migration properties of the water-soluble organic solvents. The time period was set to 168 hours in this experiment. A color tone after leaving in the environment having a temperature of 30° C. and a humidity of 80% for 168 hours was measured by means of the same spectrophotometer as that described above to determine an La*b* value after the water-soluble organic solvents had migrated. The maximum of a color difference (ΔE) was determined from the obtained results.

The above experimental results, and the relationship between the evaporation rate and moisture absorption rate of each water-soluble organic solvent showed that there was a correlation between them.

The term "migration" refers to a phenomenon in which ink in a recording medium absorbs moisture in an environment such as a high-temperature-and-high-humidity environment to cause a coloring material in the ink to move in the recording medium, thereby causing a change in color tone of a recorded article or the blurring of the recorded article to result in the deterioration of an image. In the present invention, the occurrence of migration of a coloring material in a recorded article corresponds to the fact that the coloring material has bad humidity resistance. Therefore, the smaller the color difference caused by an environment, the better the migration property of the water-soluble organic solvent. A water-soluble organic solvent having good migration property, that is, good humidity resistance is characterized in that it easily evaporates and hardly-absorbs moisture. In other words, a water-soluble organic solvent having better migration property shows a smaller maximum of the color difference ($\Delta E$). The migration properties of water-soluble organic solvents were distinguished from each other according to the following criteria on the basis of the maximum of $\Delta E$.

A: Maximum of $\Delta E \leq 5.5$

C: Maximum of $\Delta E > 5.5$

When the maximum of $\Delta E$ was 5.5 or less, no change in color tone due to migration occurred even in a high-temperature-and-high-humidity environment, so a favorable image was obtained. In contrast, when the maximum of $\Delta E$ was larger than 5.5, a change in color tone due to migration was remarkable in a high-temperature-and-high-humidity environment, and the image deteriorated. The above Expression (1) was obtained by finding out the relationship among the migration property, evaporation rate, and moisture absorption rate of each water-soluble organic solvent on the basis of the above criteria. That is, in FIG. 1, a water-soluble organic solvent placed on the right side with respect to the straight line of $Y=2.8X+10$ had a color difference ($\Delta E$) of 5.5 or less, while a water-soluble organic solvent placed on the left side with respect to the straight line of $Y=2.8X+10$ had a color difference ($\Delta E$) larger than 5.5.

Generally, in the case of attempting improvement of humidity resistance, a solvent in which a dye is hardly soluble (poor solvent) can be used. However, no relation between migration and the solubility of a dye to be used in the present invention in a water-soluble organic solvent was found. That is, an improvement of humidity resistance in the dye to be used in the present invention is governed not by the solubility of the dye in a water-soluble organic solvent but by the evaporation rate and moisture absorption rate of a water-soluble organic solvent in ink.

Specific examples of a water-soluble organic solvent satisfying the relationship represented by the Expression (1) include ethylene glycol, diethylene glycol, 2-pyrrolidone, 1,5-pentanediol, 1,6-hexanediol, and ethylene urea. Of those, ethylene urea is particularly preferable. Furthermore, ethylene urea, diethylene glycol, and 2-pyrrolidone are particularly preferably used in combination for improving ink jet properties such as reliability. Any water-soluble organic solvent not described above may also be used as long as it satisfies the relationship represented by the Expression (1). It should be noted that ethylene glycol is not shown in FIG. 1 because it has a large evaporation rate, although it satisfies the relationship of $Y \leq 2.8X+10$.

A water-soluble organic solvent that does not satisfy the relationship represented by the Expression (1) such as glycerin or urea can be used in the light-color ink according to the present invention to the extent that the addition of such water-soluble organic solvent has an effect and does not impair the objects and effects of the present invention. However, in order to sufficiently obtain the effects of the present invention, the total content (mass %) of water-soluble organic solvents each satisfying the relationship represented by the Expression (1) must be 50 mass % or more with respect to the total content (mass %) of the water-soluble organic solvents in the light-color ink.

Even in the yellow ink according to the present invention, the total content (mass %) of water-soluble organic solvents each satisfying the relationship represented by the Expression (1) is preferably 50 mass % or more with respect to the total content (mass %) of the water-soluble organic solvents in the yellow ink.

The total content (mass %) of the water-soluble organic solvents in each of the yellow and light-color inks according to the present invention is preferably 10 mass % or more and 50 mass % or less with respect to the total mass of the ink. A total content (mass %) of the water-soluble organic solvent of less than 10 mass % or in excess of 50 mass % may deteriorate ink jet properties such as reliability.

Deionized water (ion-exchanged water) is preferably used as water. The water content is preferably 10 mass % or more and 90 mass % or less with respect to the total mass of the ink.

(Coloring Material)

(Compound Represented by General Formula (I) or Salt Thereof)

The coloring material of the yellow ink according to the present invention is at least a compound represented by the following General Formula (I) or a salt thereof. The coloring material is characterized in that: it has a good color tone (hue) and good visibility requested for a yellow coloring material; and it is excellent in light resistance and water resistance.

General Formula (I)

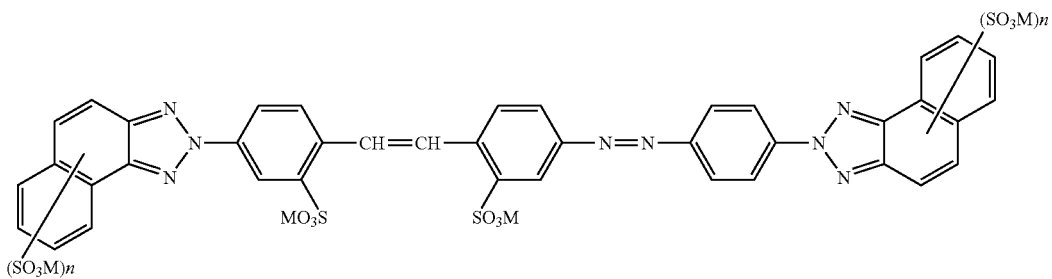

(In the General Formula (I), M's each independently represent a hydrogen atom, an alkali metal, an alkali earth metal, a cation of organic amine or an ammonium ion, and n's each independently represent 1 or 2.)

In the present invention, any other coloring material can be used in combination with the compound represented by the General Formula (I) or the salt thereof in order to obtain performance requested for yellow ink. The content (mass %) of the coloring material in the yellow ink according to the present invention is preferably 1.0 mass % or more and 4.0 mass % or less with respect to the total mass of the ink. A content of the coloring material of less than 1.0 mass % may not provide the effects of the present invention such as the color tone (hue) of yellow ink, while a content in excess of 4.0 mass % may reduce reliability such as start-up ejection stability. The content (mass %) of the compound represented by the General Formula (I) or the salt thereof is preferably 10 mass % or more with respect to the total mass of the coloring material of the yellow ink in order to sufficiently obtain the effects of the present invention.

(Coloring Material of Light-color Ink)

In the present invention, ink having a coloring material content (mass %) of 0.1 mass % or more and 2.0 mass % or less with respect to the total mass of the ink is defined as light-color ink. Any one of the following coloring materials can be used without any particular limitation as long as ink containing the coloring material satisfies the above condition. When the coloring material concentration of the light-color ink is smaller than 0.1 mass %, a large amount of ink must be applied to a recording medium in order to improve tone reproduction upon formation of an image. As a result, a large amount of solvent is present in a recorded article, so the humidity resistance of an image deteriorates.

(Other Coloring Materials)

Given below are specific examples of: a coloring material that can be used in combination with the coloring material represented by the General Formula (I) in the yellow ink according to the present invention; and a coloring material that can be used in the light-color ink according to the present invention. The present invention is not limited to the examples.

Yellow Coloring Material

C.I. Direct Yellow: 8, 11, 12, 27, 28, 33, 39, 44, 50, 58, 85, 86, 87, 88, 89, 98, 100, 110, 132, 173, etc.

C.I. Acid Yellow: 1, 3, 7, 11, 17, 23, 25, 29, 36, 38, 40, 42, 44, 76, 98, 99, etc.

C.I. Pigment Yellow: 1, 2, 3, 12, 13, 14, 15, 16, 17, 73, 74, 75, 83, 93, 95, 97, 98, 114, 128, 138, 180, etc.

Of the above yellow coloring materials, C.I. Direct Yellow 132 is particularly preferably used in combination with the compound represented by the General Formula (I) or the salt thereof because an excellent color tone can be obtained.

Magenta Coloring Material

C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229, 230, etc.

C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289, etc.

C.I. Food Red: 87, 92, 94, etc.

C.I. Direct Violet: 107, etc.

C.I. Pigment Red: 2, 5, 7, 12, 48:2, 48:4, 57:1, 112, 122, 123, 168, 184, 202, etc.

Examples of other coloring materials that can be preferably used as magenta coloring materials include the following coloring materials.

Compound (1)

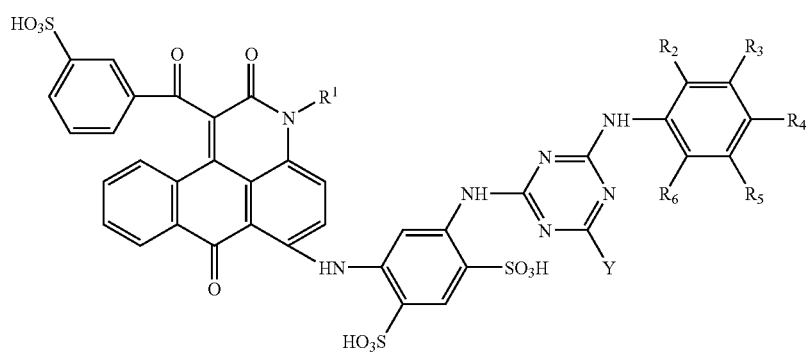

(In Compound (1), $R_1$ represents a hydrogen atom, an alkyl group, a hydroxy lower alkyl group, a cyclohexyl group, a monoalkyl aminoalkyl or dialkyl aminoalkyl group, or a cyano lower alkyl group; Y represents a chlorine atom, a hydroxyl group, an amino group, or a monoalkylamino or dialkylamino group (which may have a substituent selected from the group consisting of a sulfonic group, a carboxyl group, and a hydroxyl group on an alkyl group); and $R_2$, $R_3$, $R_4$, $R_5$ and $R_6$ each independently represent a hydrogen atom, an alkyl group having 1 to 8 carbon atoms, or a carboxyl group (provided that $R_2$, $R_3$, $R_4$, $R_5$, and $R_6$ cannot simultaneously represent hydrogen atoms).)

Specific examples of the coloring materials each represented by the above Compound (1) include Exemplified Compounds having the following structures in the forms of free acids. Of those, Exemplified Compound M7 is particularly preferably used.

Exemplified Compounds M1 to M7
Cyan Coloring Material
C.I. Direct Blue: 1, 15, 22, 25, 41, 76, 77, 80, 86, 90, 98, 106, 108, 120, 158, 163, 168, 199, 226, 307, etc.
C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, 244, etc.
C.I. Pigment Blue: 1, 2, 3, 15, 15:2, 15:3, 15:4, 16, 22, 60, etc.

Examples of other coloring materials that can be preferably used as cyan coloring materials include the following coloring materials.

A phthalocyanine compound prepared by reacting a 4-sulfophthalic acid derivative, or a 4-sulfophthalic acid derivative and a phthalic acid (anhydride) derivative, in the presence of a metal compound is used as a raw material for Compound (2) to be used in the present invention. A sulfonic group in the phthalocyanine compound is transformed into a chlorosulfonic acid group, and then an amination agent is allowed to react with the resultant in the presence of an organic amine to synthesize Compound (2).

Formula (a)

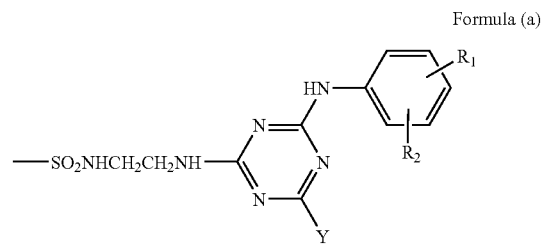

Preferable specific examples of the substituted sulfamoyl group represented by the formula (a) are shown below. Of course, the substituted sulfamoyl group to be used in the present invention is not limited thereto. The substituted sulfamoyl group represented by the General Formula (V) is Compound (2)

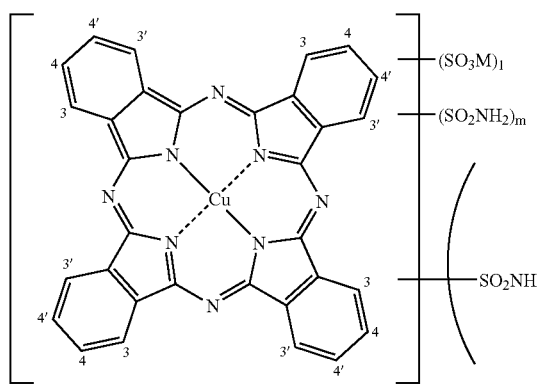

(In Compound (2), l represents 0 to 2, m represents 1 to 3, and n represents 1 to 3 (provided that l+m+n=3 to 4); the positions at which substituents are present are 4-position or 4'-position; M represents an alkali metal or ammonium; $R_1$ and $R_2$ each independently represent a hydrogen atom, a sulfonic group, or a carboxyl group (provided that $R_1$ and $R_2$ cannot simultaneously represent hydrogen atoms); and Y represents a chlorine atom, a hydroxyl group, an amino group, or a monoalkylamino or dialkylamino group.)

A coloring material represented by the above Compound (2) is a phthalocyanine derivative obtained by: selectively introducing a sulfonic group, an unsubstituted sulfamoyl group (—$SO_2NH_2$), or a substituted sulfamoyl group (a group represented by the following Formula (a)) into each of 4-position and 4'-position in Compound (2); and setting the number of substituents to 3 or 4.

shown in the form of a free acid. Of those, a compound substituted by Exemplified Substituent C1 is particularly preferable.

Exemplified Substituents C1 to C7

Exemplified Substituent C1

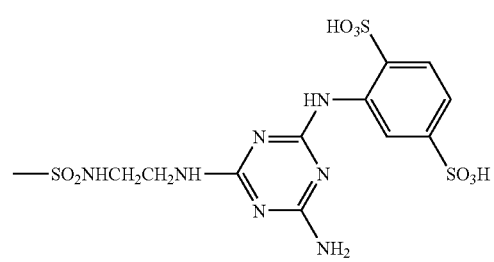

Exemplified Substituent C2

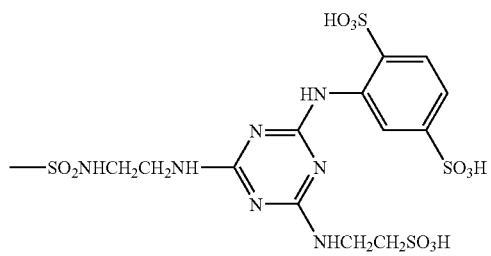

Exemplified Substituent C3

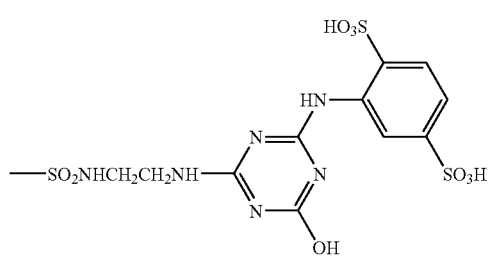

Exemplified Substituent C4

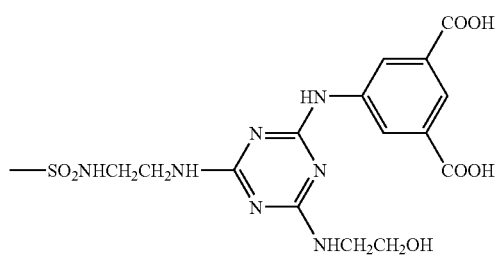

Exemplified Substituent C5

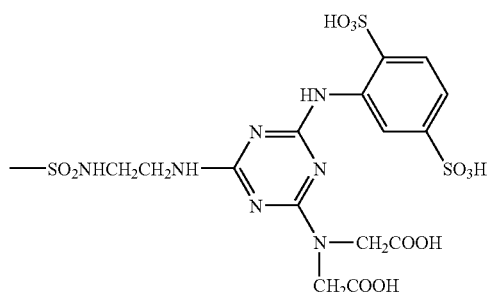

Exemplified Substituent C6

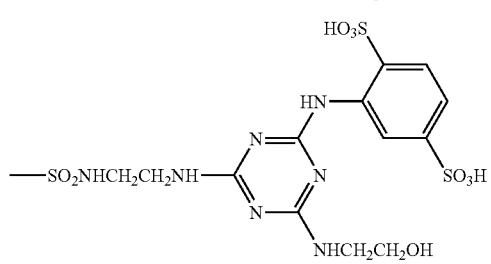

Exemplified Substituent C7

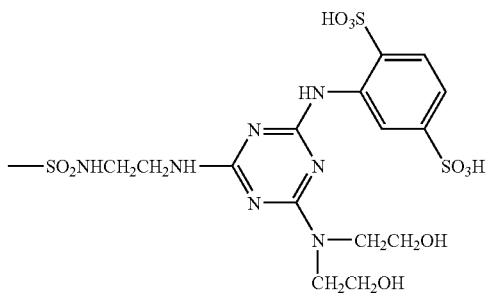

Coloring Materials Having Other Color Tones

The yellow ink according to the present invention may be used in combination with so-called special color inks such as black, red, green, and blue inks as required as well as the above inks. Examples of coloring materials that can be incorporated into those inks are shown below. Of course, the present invention is not limited thereto.

C.I. Acid Orange: 7, 8, 10, 12, 24, 33, 56, 67, 74, 88, 94, 116, 142, etc.

C.I. Acid Red: 111, 114, 266, 374, etc.

C.I. Direct Orange: 26, 29, 34, 39, 57, 102, 118, etc.

C.I. Food Orange: 3, etc.

C.I. Reactive Orange: 1, 4, 5, 7, 12, 13, 14, 15, 16, 20, 29, 30, 84, 107, etc.

C.I. Disperse Orange: 1, 3, 11, 13, 20, 25, 29, 30, 31, 32, 47, 55, 56, etc.

C.I. Pigment Orange: 43, etc.

C.I. Pigment Red: 122, 170, 177, 194, 209, 224, etc.

C.I. Acid Green: 1, 3, 5, 6, 9, 12, 15, 16, 19, 21, 25, 28, 81, 84, etc.

C.I. Direct Green: 26, 59, 67, etc.

C.I. Food Green: 3, etc.

C.I. Reactive Green: 5, 6, 12, 19, 21, etc.

C.I. Disperse Green: 6, 9, etc.

C.I. Pigment Green: 7, 36, etc.

C.I. Acid Blue: 62, 80, 83, 90, 104, 112, 113, 142, 203, 204, 221, 244, etc.

C.I. Reactive Blue: 49, etc.

C.I. Acid Violet: 17, 19, 48, 49, 54, 129, etc.

C.I. Direct Violet: 9, 35, 47, 51, 66, 93, 95, 99, etc.

C.I. Reactive Violet: 1, 2, 4, 5, 6, 8, 9, 22, 34, 36, etc.

C.I. Disperse Violet: 1, 4, 8, 23, 26, 28, 31, 33, 35, 38, 48, 56, etc.

C.I. Pigment Blue: 15:6, etc.

C.I. Pigment Violet: 19, 23, 37, etc.

C.I. Direct Black: 17, 19, 22, 31, 32, 51, 62, 71, 74, 112, 113, 154, 168, 195, etc.

C.I. Acid Black: 2, 48, 51, 52, 110, 115, 156, etc.

C.I. Food Black: 1, 2, etc.

Carbon black (Other Additive)

The ink of the present invention may contain a moisture-retaining solid content such as urea or a derivative thereof as its component as required.

In addition, various additives such as a surfactant, a pH adjustor, a rust inhibitor, an antiseptic, an antifungus agent, an antioxidant, an antireducing agent, an evaporation accelerator, a chelating agent, and a water-soluble polymer may be incorporated into the ink of the present invention as required.

<Recording Medium>

Any recording medium can be used for forming images by means of the ink of the present invention as long as recording is performed by applying the ink to the recording medium.

The present invention is applicable to a recording medium in which a coloring material such as a pigment is adsorbed to fine particles forming a porous structure in an ink-receiving layer and an image is formed from at least the fine particles with the coloring material adsorbed thereto, and is particularly suitable for the case where an ink jet method is used. Such an ink jet recording medium is preferably of a so-called absorption type in which ink is absorbed by a gap formed in an ink-receiving layer on a support.

An absorption type ink-receiving layer is constituted as a porous layer mainly composed of fine particles and containing a binder and any other additive as required. Specific examples of the fine particles include: inorganic pigments such as silica, clay, talc, calcium carbonate, kaolin, aluminum oxide (for example, alumina or alumina hydrate), diatomaceous earth, titanium oxide, hydrotalcite, and zinc oxide; and organic pigments such as a urea formalin resin, an ethylene resin, and a styrene resin. One or more kinds of them may be used. Examples of a binder that is suitably used include a water-soluble polymer and latex. For example, the following may be cited: polyvinyl alcohol or a modified product thereof; starch or a modified product thereof; gelatin or a modified product thereof; gum arabic; cellulose derivatives such as carboxymethylcellulose, hydroxyethylcellulose, and hydroxyproylmethylcellulose; vinyl-based copolymer latexes such as an SBR latex, an NBR latex, a methyl methacrylate-butadiene copolymer latex, a functional group-denatured polymer latex, and an ethylene-vinyl acetate copolymer; polyvinyl pyrrolidone; maleic anhydride or a copolymer thereof; and an acrylate copolymer. Two or more kinds of them may be used in combination as required. In addition, an additive may be used, and examples of an additive to be used as required include a dispersant, a thickener, a pH adjustor, a lubricant, a fluidity denaturing agent, a surfactant, a defoaming agent, a releasing agent, a fluorescent bleach, a UV absorber, and an antioxidant.

In particular, a recording medium having an ink-receiving layer formed thereon which is mainly composed of fine particles having an average particle size of 1 μm or less is preferably used in the present invention. Specific examples of the fine particles include silica fine particles and aluminum oxide fine particles. Preferable silica fine particles are silica fine particles typified by colloidal silica. Colloidal silica, which itself is available in the market, is particularly preferably what is described in JP 2803134 B or JP 2881847 B. Preferable aluminum oxide fine particles are alumina hydrate fine particles and the like. An alumina hydrate represented by the following general formula may be exemplified as one example of such alumina hydrate fine particles.

$Al_2O_{3-n}(OH)_{2n} \cdot mH_2O$ (In the formula, n represents an integer of 1, 2, or 3, and m represents a value of 0 to 10, or preferably 0 to 5; provided, however, that m and n are not simultaneously 0. m may be or may not be an integer because $mH_2O$ also represents an aqueous phase that can desorb and is not involved in the formation of an mH2O crystal lattice in many cases. In addition, when heating such kind of material, m may reach 0.)

An alumina hydrate can be produced by a conventionally known method such as: the hydrolysis of aluminum alkoxide or sodium aluminate described in U.S. Pat. Nos. 4,242,271 and 4,202,870; or a method involving adding an aqueous solution of sodium sulfate, aluminum chloride, or the like to an aqueous solution of sodium aluminate or the like to perform neutralization described in Japanese Patent Publication No. S57-44605.

The recording medium preferably has a support for supporting the above-described ink-receiving layer. Any support may be use without any particular limitation as long as its ink-receiving layer can be formed of the above-described porous fine particles and it provides rigidity which enables it to be conveyed by a conveying mechanism of an ink jet printer or the like. Specific examples thereof include: a paper support formed of a pulp raw material mainly composed of natural cellulose fibers; a plastic support composed of a material such as polyester (for example, polyethylene terephthalate), cellulose triacetate, polycarbonate, polyvinyl chloride, polypropylene, or polyimide; resin-coated paper (for example, RC paper) having, on at least one side of base paper, a polyolefin resin coating layer in which a white pigment or the like is added.

<Ink Set>

The ink of the present invention can be preferably used in combination with any other ink to provide an ink set. The term "ink set" as used herein refers to a state where the ink of the present invention is used in combination with any other ink such as cyan ink, magenta ink, yellow ink, or black ink. There is no particular limitation on the other ink that can be used in combination with the ink of the present invention to provide an ink set. The term "ink set" as used herein includes, of course, an ink tank itself having multiple ink-tanks integrated. Furthermore, the term includes a state where a plurality of separate ink tanks are used in combination, and a state where these ink tanks and a recording head are integrated. In particular, in the present invention, yellow ink or light-color ink constituting the ink set satisfies the constitution of the present invention.

<Ink Jet Recording Method>

The ink according to the present invention is particularly suitably used for an ink jet recording method including the step of ejecting the ink by an ink jet method. Examples of the ink jet recording method include a recording method involving applying mechanical energy to ink to eject the ink and a recording method involving applying thermal energy to ink to eject the ink. An ink jet recording method involving the use of thermal energy is particularly preferably used in the present invention.

<Ink Cartridge>

An example of an ink cartridge suitable for performing recording by using the ink according to the present invention includes an ink cartridge including an ink storage portion for storing the ink.

<Recording Unit>

An example of a recording unit suitable for performing recording by using the ink according to the present invention includes a recording unit including an ink storage portion for storing the ink and a recording head. In particular, a recording unit in which the recording head applies thermal energy corresponding to a recording signal to the ink to generate an ink droplet by virtue of the energy can be exemplified.

<Ink Jet Recording Apparatus>

An example of a recording apparatus suitable for performing recording by using the ink according to the present invention includes a recording apparatus in which thermal energy corresponding to a recording signal is applied to ink in the chamber of a recording head having an ink storage portion for storing the ink to generate an ink droplet by virtue of the energy.

The schematic constitution of a mechanism portion of an ink jet recording apparatus will be described below. A recording apparatus main body is constituted of a sheet feeding portion, a sheet conveying portion, a carriage portion, a sheet discharge portion, and a cleaning portion, and an external packaging portion for protecting them and providing them with a design, each of which plays a role of each mechanism. The outline of each of them will be described below.

Figure 2:
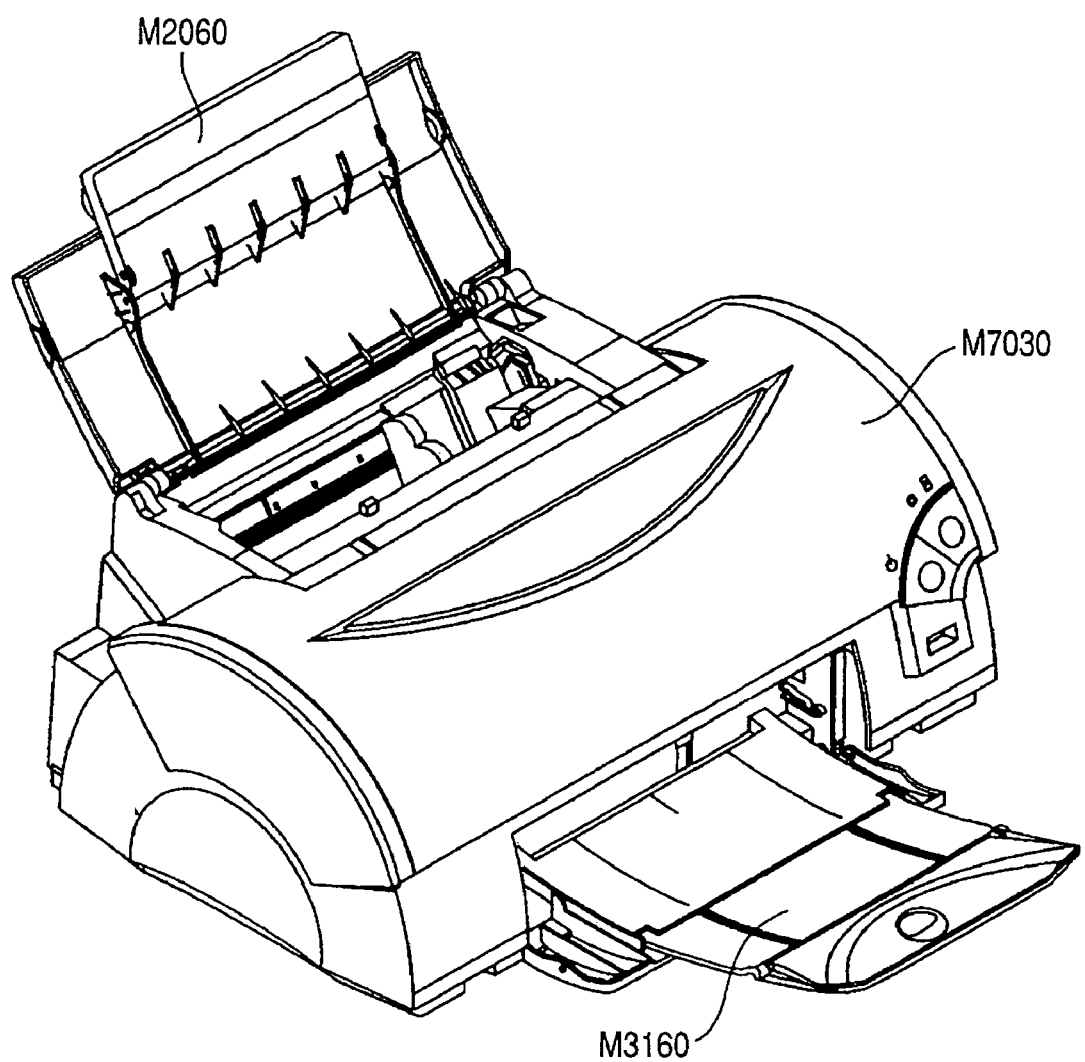
FIG. 2 is a perspective view of a recording apparatus.
Figure 3:
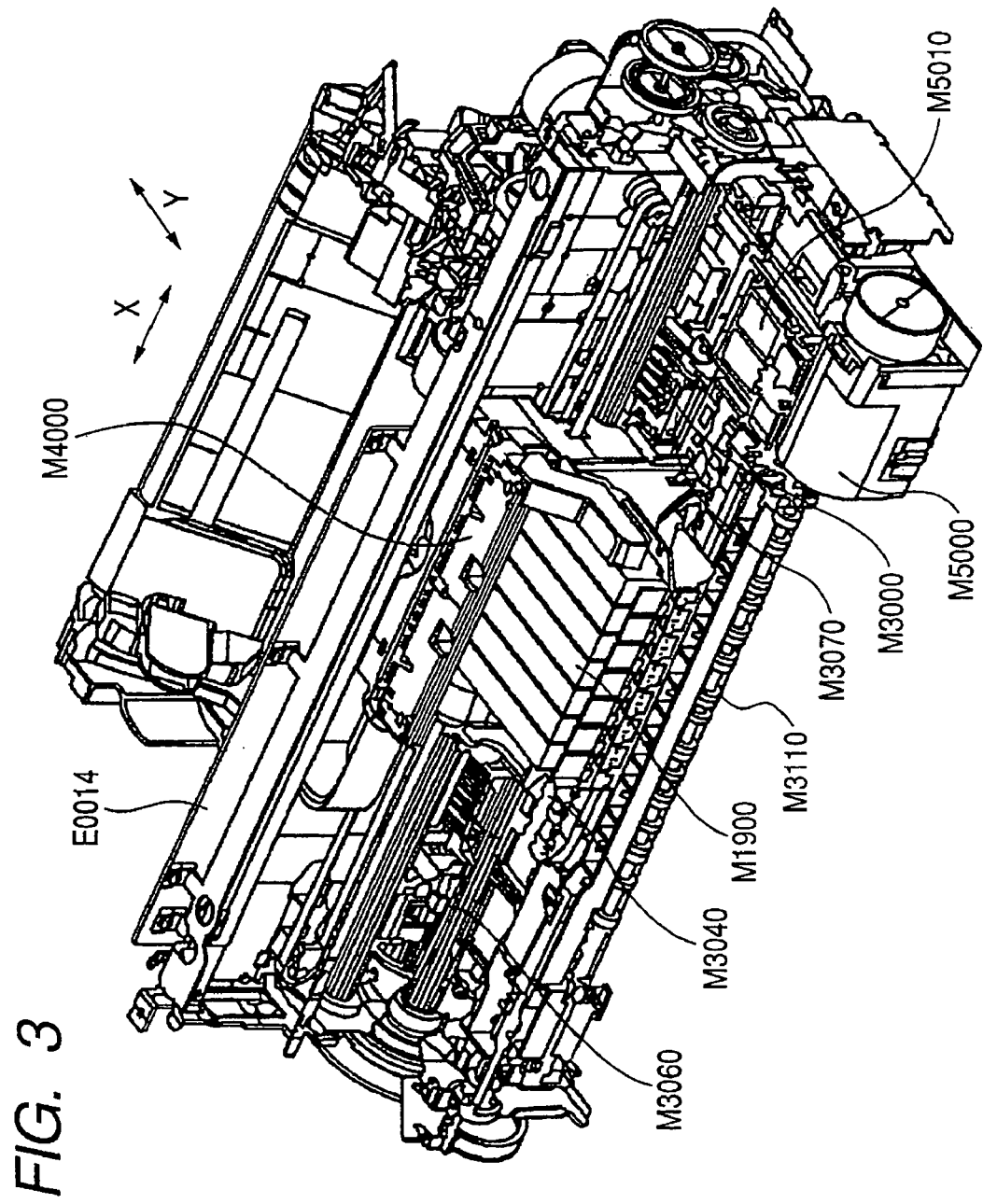
FIG. 3 is a perspective view of a mechanism portion of the recording apparatus.

FIG. 1 is a perspective view of a recording apparatus. FIGS. 2 and 3 are views for explaining the internal mechanism of a recording apparatus main body. FIG. 2 is a perspective view seen from an upper right portion, and FIG. 3 is a side sectional view of the recording apparatus main body.

When sheets are fed in the recording apparatus, only the predetermined number of recording media are sent to a nip portion composed of a sheet feeding roller M2080 and a separating roller M2041 in the sheet feeding portion including a sheet feeding tray M2060. The sent recording media are separated at the nip portion, and only the uppermost recording medium is conveyed. The recording medium sent to the sheet conveying portion is guided by a pinch roller holder M3000 and a paper guide flapper M3030 to be sent to a roller pair composed of a conveying roller M3060 and a pinch roller M3070. The roller pair composed of the conveying roller M3060 and the pinch roller M3070 are driven and rotated by an LF motor E0002, whereby the recording medium is conveyed through a platen M3040.

In the carriage portion, when an image is formed on a recording medium, a recording head H1001 (FIG. 4) is arranged at a target image forming position, and ink is ejected to the recording medium in accordance with a signal from an electrical substrate E0014. Details about the constitution of the recording head H1001 will be described later. While recording is performed by the recording head H1001, recording main scanning in which a carriage M4000 scans in the column direction and sub scanning in which a recording medium is conveyed in the row direction by the conveying roller M3060 are alternately repeated, whereby an image is formed on the recording medium.

Finally, the recording medium on which an image has been formed is pinched at a nip between a first sheet discharge roller M3110 and a spur M3120 in the sheet discharge portion, conveyed, and discharged to a sheet discharge tray M3160.

In the cleaning portion, when a pump M5000 is allowed to act in such a state that a cap M5010 is brought into close contact with an ink ejection port of the recording head H1001 for the purpose of cleaning the recording head H1001 before and after image recording, unnecessary ink and the like are sucked from the recording head H1001. The ink remaining in the cap M5010 is sucked with the cap M5010 opened, whereby neither adhesion of the remaining ink nor a subsequent harmful effect occurs.

(Constitution of Recording Head)

The constitution of a head cartridge H1000 will be described below. The head cartridge H1000 includes the recording head H1001, means for mounting ink tanks H1900, and means for supplying ink from the ink tanks H1900 to the recording head, and is detachably mounted on the carriage M4000.

Figure 4:
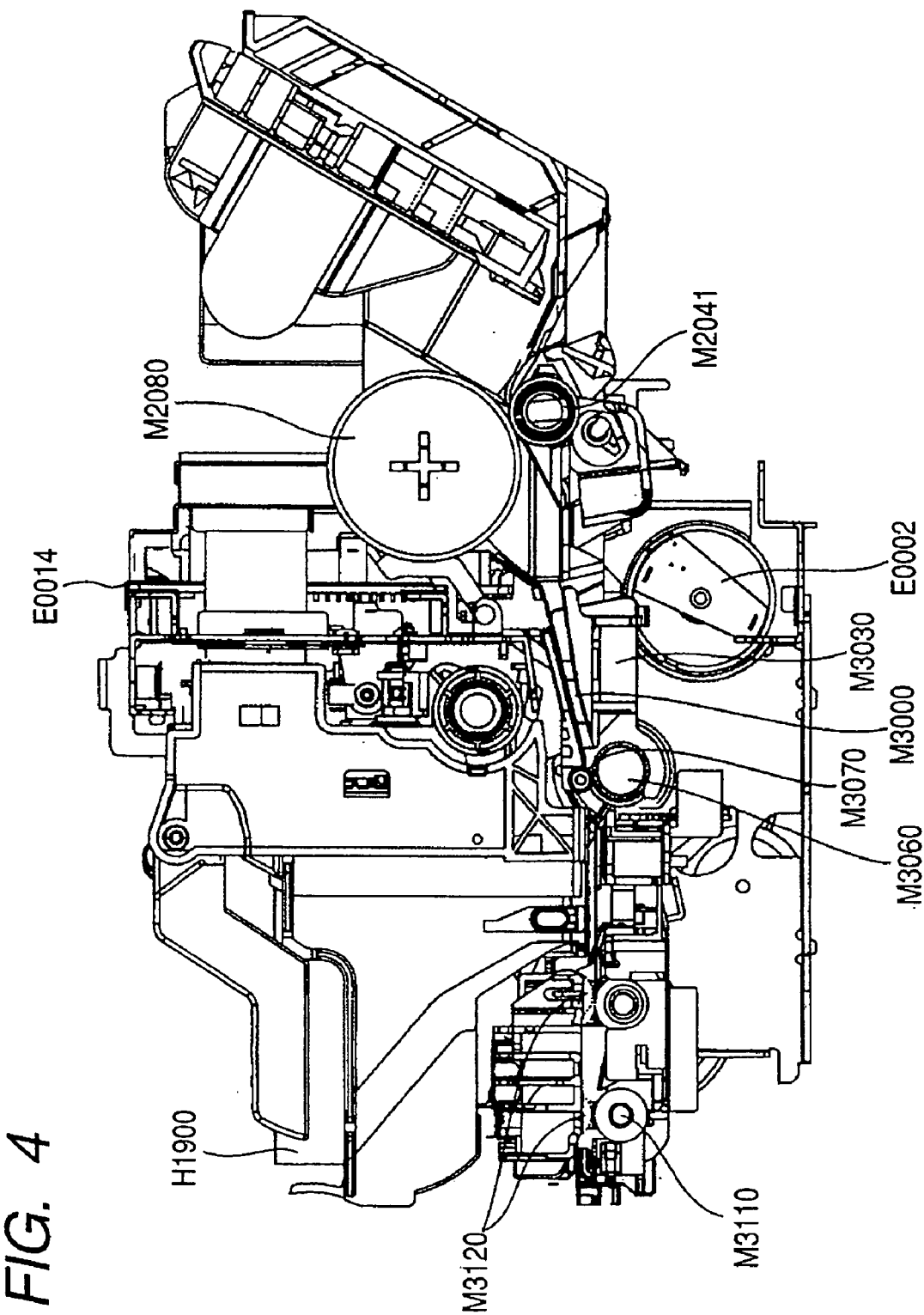
FIG. 4 is a sectional view of the recording apparatus.

FIG. 4 shows how the ink tanks H1900 are mounted on the head cartridge H1000. The recording apparatus forms images by means of yellow, magenta, cyan, black, pale magenta, pale cyan, and green inks, and so the ink tanks H1900 are independently prepared for seven colors. The ink according to the present invention is used for at least one of the above inks. In addition, as shown in the figure, each ink tank is detachable to the head cartridge H1000. The ink tanks H1900 can be detached in such a state that the head cartridge H1000 is mounted on the carriage M4000.

Figure 5:
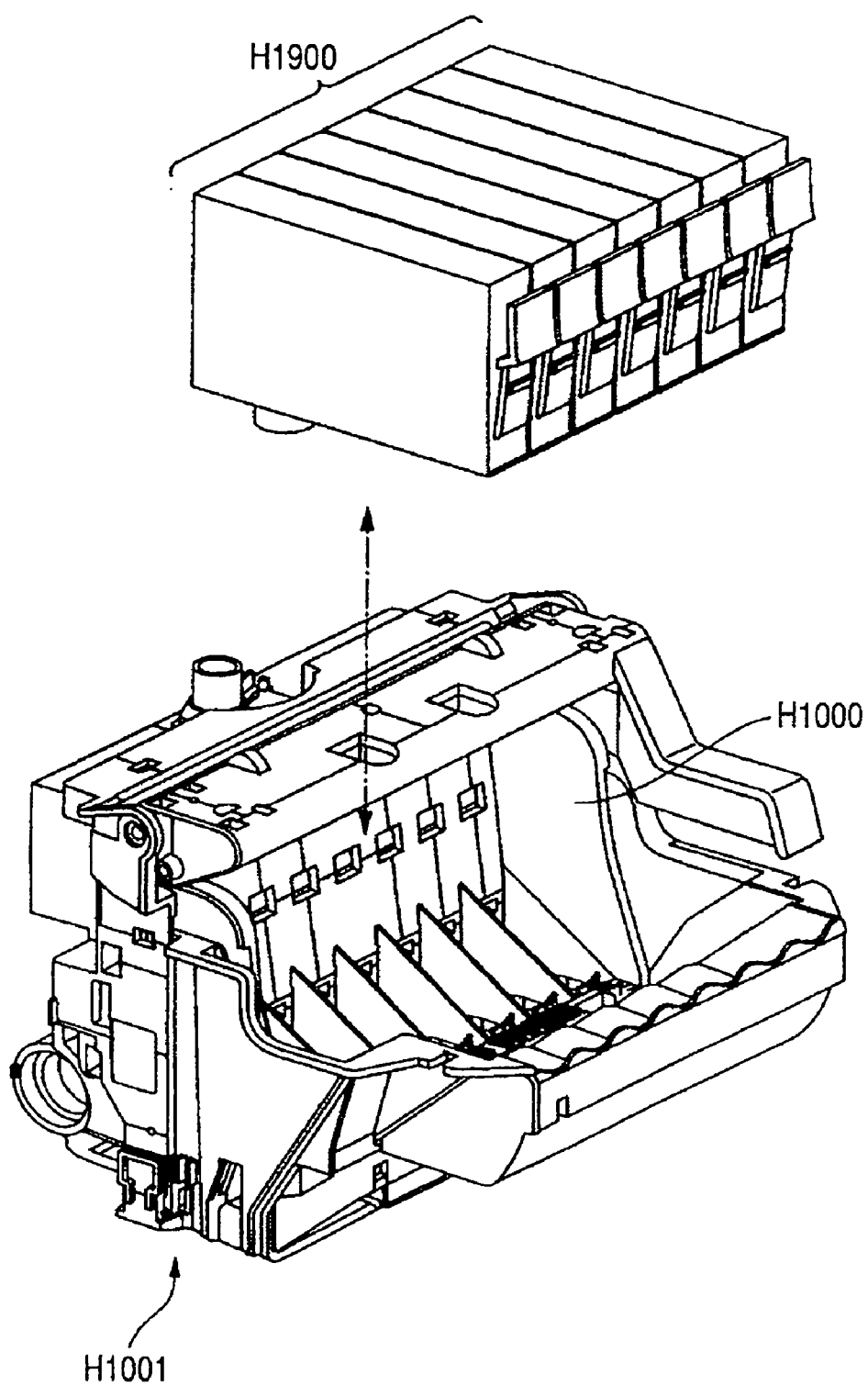
FIG. 5 is a perspective view showing a state where an ink tank is mounted on a head cartridge.

FIG. 5 shows an exploded perspective view of the head cartridge H1000. In the figure, the head cartridge H1000 includes a first recording element substrate H1100, a second recording element substrate H1101, a first plate H1200, a second plate H1400, an electric wiring substrate H1300, a tank holder H1500, a flow path forming member H1600, a filter H1700, and a seal rubber H1800.

Each of the first recording element substrate H1100 and the second recording element substrate H1101 is a Si substrate having multiple recording elements (nozzles) for ejecting ink formed on one side by means of photolithography. Electric wiring made of Al or the like for supplying power to each recording element is formed by means of a film formation technique, and multiple ink flow paths corresponding to the individual recording elements are also formed by means of photolithography. Furthermore, ink supply ports for supplying ink to the multiple ink flow paths are formed so as to open on the rear surface.

Figure 6:
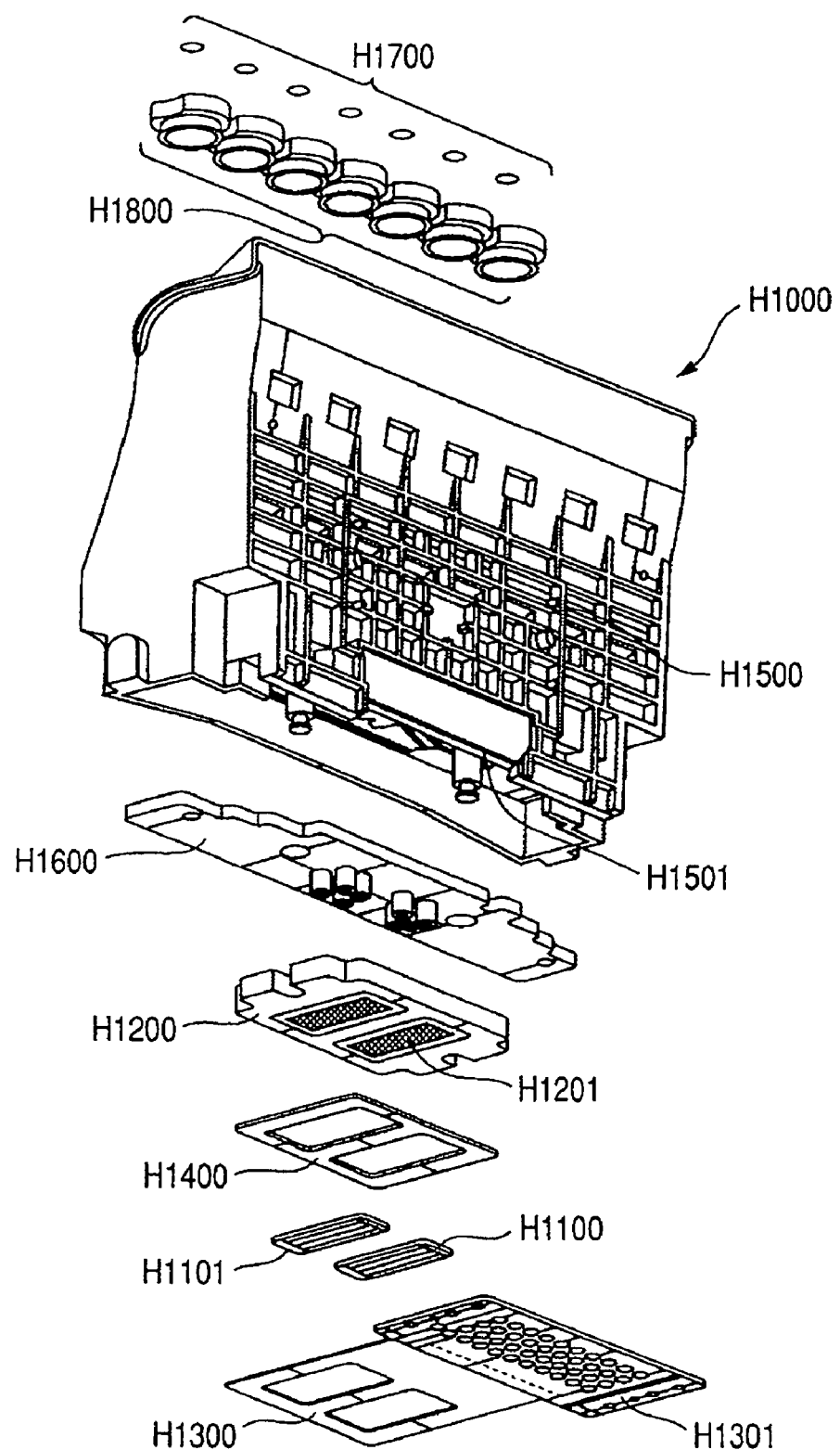
FIG. 6 is an exploded perspective view of the head cartridge.
Figure 7:
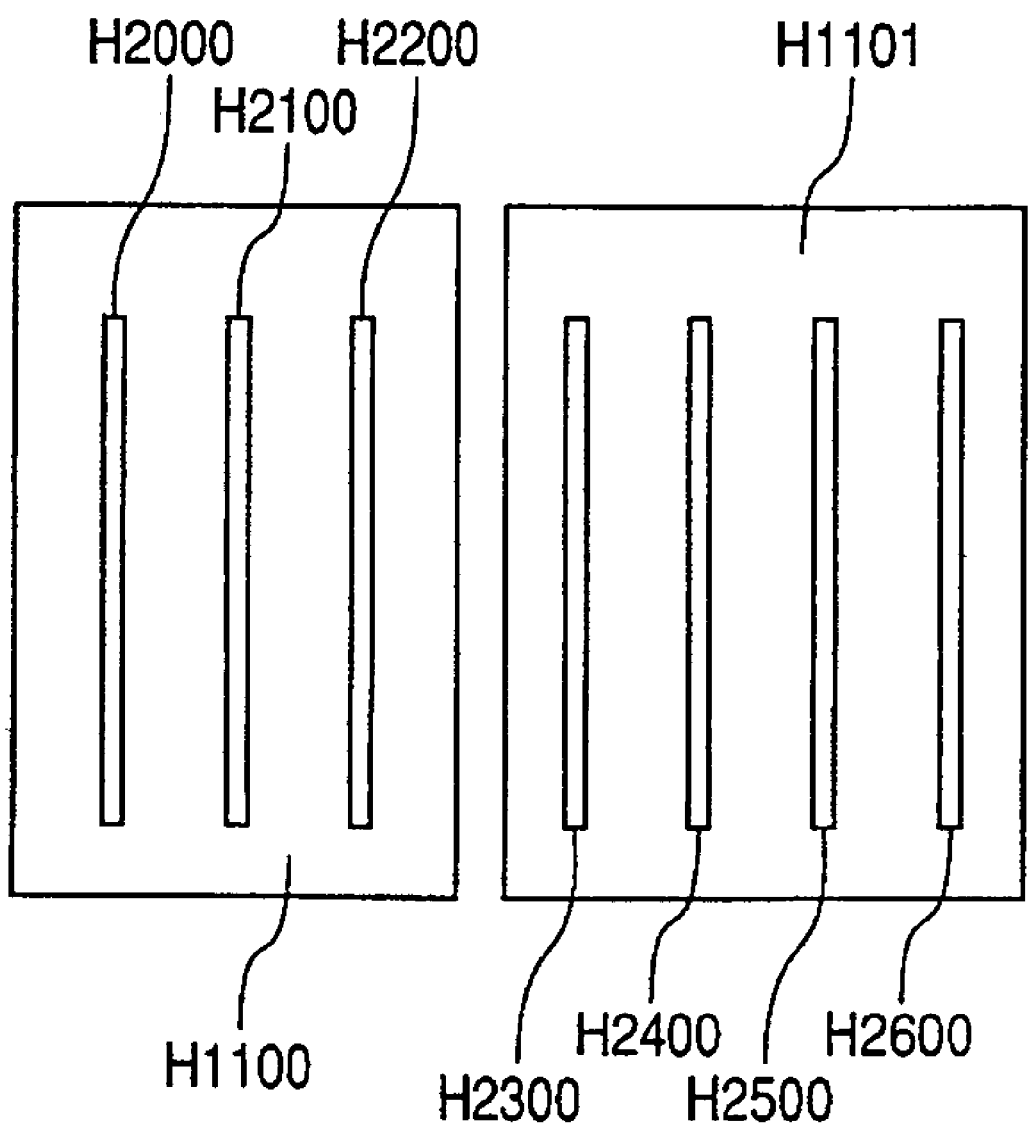
FIG. 7 is a front view showing a recording element substrate in the head cartridge.

FIG. 6 is an enlarged front view for explaining the constitution of each of the first recording element substrate H1100 and the second recording element substrate H1101. Reference symbols H2000 to H2600 denote recording element trains (hereinafter referred to also as nozzle trains) corresponding to different ink colors. The first recording element substrate H1100 has nozzle trains for three colors: the nozzle train H2000 to which yellow ink is supplied, the nozzle train H2100 to which magenta ink is supplied, and the nozzle train H2200 to which cyan ink is supplied. The second recording element substrate H1101 has nozzle trains for four colors: the nozzle train H2300 to which pale cyan ink is supplied, the nozzle train H2400 to which black ink is supplied, the nozzle train H2500 to which orange ink is supplied, and the nozzle train H2600 to which pale magenta ink is supplied.

Each nozzle train is constituted by 768 nozzles arranged at intervals of 1,200 dpi (dot/inch; reference value) in the conveying direction of a recording medium, and each nozzle ejects about 2 pl of ink. An opening area in each nozzle ejection port is set to be about 100 $\mu m^2$. The first recording element substrate H1100 and the second recording element substrate H1101 are bonded and fixed to the first plate H1200 having ink supply ports H1201 formed thereon for supplying ink to the first recording element substrate H1100 and the second recording element substrate H1101.

The second plate H1400 having openings is also bonded and fixed to the first plate H1200. The second plate H1400 holds the electric wiring substrate H1300 in such a manner that the electric wiring substrate H1300, the first recording element substrate H1100, and the second recording element substrate H1101 are electrically connected.

The electric wiring substrate H1300 impresses electrical signals for causing each of the nozzles formed on the first recording element substrate H1100 and the second recording element substrate H1101 to eject ink. The electric wiring substrate H1300 has: electric wiring corresponding to each of the first recording element substrate H1100 and the second recording element substrate H1101; and an external signal input terminal H1301 which is positioned at the end portion of the electric wiring to receive electrical signals from the recording apparatus main body. The external signal input terminal H1301 is positioned and fixed to the back surface side of the tank holder H1500.

The flow path forming member H1600 is fixed by means of, for example, ultrasonic welding to the tank holder H1500 for holding the ink tanks H1900. Thus, an ink flow path H1501 passing from the ink tanks H1900 to the first plate H1200 is formed.

The filter H1700 is arranged at the end portion on the ink tank side of the ink flow path H1501 engaged with the ink tanks H1900, and so the filter H1700 prevents dust from entering from the outside. The seal rubber H1800 is mounted on the portion at which the ink flow path H1501 is engaged with the ink tanks H1900 to prevent ink from evaporating from the portion.

Furthermore, as described above, the head cartridge H1000 is made up by connecting a tank holder portion constituted of the tank holder H1500, the flow path forming member H1600, the filter H1700 and the seal rubber H1800, with the recording head portion H1001 constituted of the first recording element substrate H1100, the second recording element substrate H1101, the first plate H1200, the electric wiring substrate H1300 and the second plate H1400 by the use of an adhesive or the like.

Description has been made here by taking, as an example of an embodiment of a recording head, a recording head according to a bubble jet (registered trademark) method that performs recording by means of an electrothermal converter (recording element) for generating thermal energy for causing ink to generate film boiling in accordance with an electrical signal.

As for the representative structure and principle, it is preferred to use basic principles disclosed in, for example, U.S. Pat. Nos. 4,723,129 and 4,740,796. The method is applicable to any one of a so-called on-demand type and a so-called continuous type. In particular, the method is effective for the on-demand type because of the following reason. At least one driving signal which corresponds to recording information and causes a sudden increase in temperature exceeding nuclear boiling is applied to electrothermal converters arranged corresponding to a sheet or liquid flow path holding a liquid (ink), thereby causing the electrothermal converter to generate thermal energy. Then, film boiling is generated on the thermal action surface of a recording head. As a result, an air bubble in the liquid (ink) can be formed so as to be in one-to-one correspondence with the driving signal. The growth and contraction of the air bubble eject the liquid (ink) through an opening for ejection, thereby forming at least one droplet. It is more preferable that the driving signal is of a pulse shape because the growth and contraction of an air bubble can be performed immediately and appropriately, and hence the liquid (ink) can be ejected with excellent responsiveness.

As an example of a second embodiment of an ink jet recording apparatus utilizing mechanical energy, an on-demand ink jet recording head may be cited, including: a nozzle forming substrate having multiple nozzles; pressure generating means arranged so as to be opposite to the nozzles and composed of a piezoelectric material and a conductive material; and ink filling the surroundings of the pressure generating means, in which the pressure generating means is displaced by an applied voltage to eject a small ink droplet from a nozzle.

The ink jet recording apparatus is not limited to such apparatuses as described above in which a head and an ink tank are separated, and may be one in which a head and an ink tank are unified so that they are unseparable. The ink tank may be separably or unseparably unified with the head to be mounted on a carriage, or may be mounted at a fixing portion of an apparatus to supply ink to a recording head through an ink supply member such as a tube. When the ink tank is provided with a constitution for applying a suitable negative pressure to the recording head, an absorber may be arranged in an ink storage portion of the ink tank, or the ink tank may have a flexible ink storage bag and a spring portion for applying bias in the direction of expanding the internal volume of the bag. The recording apparatus may adopt a serial recording method as described above, or may be in the form of a line printer obtained by aligning recording elements over the range corresponding to the entire width of a recording medium.

EXAMPLES

Hereinafter, the present invention will be described in more detail by way of examples and comparative examples.

However, the present invention is not limited to the following examples unless the examples depart from the gist of the present invention. Unless otherwise specified, the term "part" of each ink component in examples and comparative examples represents "part by mass".

<Preparation of Coloring Material>

Diazotized 4-nitro-4'-aminostilbene-2,2-disulfonic acid and 3-aminonaphthalene-1-sulfonic acid were subjected to coupling. The resultant was turned into a triazole, and a nitro group of the triazole was reduced to an amino group by means of a conventionally known method to produce aminostilbene-triazole. Aminostilbene-triazole was dissolved into water, and sodium nitrite and hydrochloric acid were added dropwise to the solution to perform diazotization. The resultant was added dropwise to an aqueous solution of a compound represented by Compound (4) below, and the whole was subjected to coupling, followed by dialysis with sodium chloride. The compound was diazotized with an aqueous solution of sodium nitrite, and was turned into a triazole by adding an aqueous solution of 6-aminonaphthalene-2-sulfonic acid. The triazole was dialyzed with sodium chloride to prepare a coloring material represented by Exemplified Compound 1 below.

Compound (4)

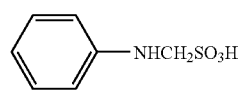

Exemplified Compound 1

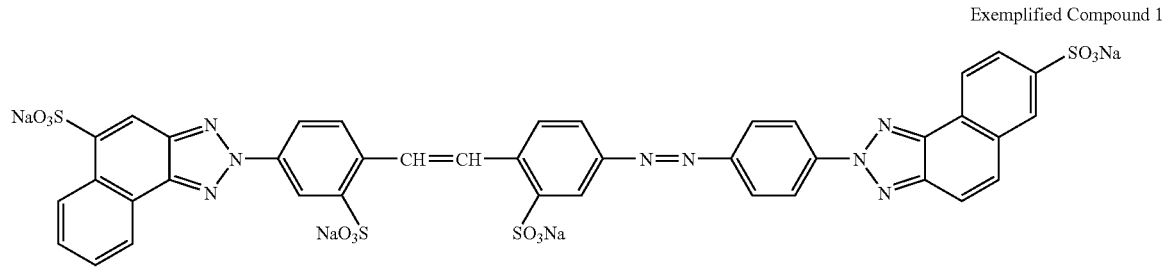

<Preparation of Ink>

The resultant yellow coloring material Y1, C.I. Direct Yellow 132, C.I. Direct Yellow 142, and C.I. Acid Yellow 23 were used to prepare yellow inks 1 to 7 in accordance with the formulations shown in Table 1. In addition, C.I. Direct Blue 199 was used as a cyan coloring material C1 and C.I. Acid Red 52 was used as a magenta coloring material M1 to prepare light-color cyan inks 1 to 7 in accordance with the formulations shown in Table 2 and light-color magenta inks 1 to 7 in accordance with the formulations shown in Table 3. It should be noted that the cyan coloring material and the magenta coloring material are not particularly limited to them.

TABLE 1

| | Yellow ink | | | | | | |
|---|---|---|---|---|---|---|---|
| | 1 | 2 | 3 | 4 | 5 | 6 | 7 |
| Yellow coloring material Y1 | 3.0 | 0.6 | 0.6 | 0.6 | 0.6 | 0.6 | |
| C.I. Direct Yellow 132 | | 2.4 | | 2.4 | 2.4 | 2.4 | 0.6 |
| C.I. Direct Yellow 142 | | | 2.4 | | | | |
| C.I. Acid Yellow 23 | | | | | | | 2.4 |
| Ethylene glycol | | | | | | | |
| Diethylene glycol | 9.0 | 9.0 | 9.0 | 8.0 | 8.0 | 6.5 | 9.0 |
| 2-pyrrolidone | 5.5 | 5.5 | 5.5 | 5.0 | 5.0 | 6.0 | 5.5 |
| Urea | | | | 7.0 | 10.0 | 10.0 | |
| Glycerin | 8.5 | 8.5 | 11.0 | 6.0 | 3.7 | 9.0 | 11.0 |
| A-E100(*1) | 0.9 | 0.9 | 0.9 | | | 0.9 | 0.9 |
| Pure water | 73.1 | 73.1 | 70.6 | 71.0 | 70.3 | 64.6 | 70.6 |
| Total amount of solvents: a | 23.0 | 23.0 | 25.5 | 26.0 | 26.7 | 31.5 | 25.5 |
| Amount of solvent satisfying Expression (1): b | 14.5 | 14.5 | 14.5 | 13.0 | 13.0 | 12.5 | 14.5 |
| b/a × 100 (%) | 63.0 | 63.0 | 56.9 | 50.0 | 48.7 | 39.7 | 56.9 |

(*1)Acetylene glycol ethylene oxide adduct (manufactured by Kawaken Fine Chemicals Co., Ltd.)

TABLE 2

| | Light-color cyan ink | | | | | | |
|---|---|---|---|---|---|---|---|
| | 1 | 2 | 3 | 4 | 5 | 6 | 7 |
| Cyan coloring material C1 | 1.5 | 1.0 | 0.09 | 2.0 | 2.0 | 2.0 | 2.1 |
| Ethylene glycol | 9.0 | 9.0 | 9.0 | 10.0 | 10.0 | 9.0 | 10.0 |
| Diethylene glycol | | | | | | | |
| 2-pyrrolidone | 7.5 | 7.5 | 7.5 | 4.0 | 4.0 | 4.0 | 4.0 |
| Urea | | | | 2.0 | 3.0 | 7.5 | 2.0 |
| Glycerin | 11.0 | 11.0 | 11.0 | 12.0 | 11.5 | 12.0 | 12.0 |
| A-E100(*1) | 0.9 | 0.9 | 0.9 | 0.9 | 0.9 | 0.9 | 0.9 |
| Pure water | 70.1 | 70.6 | 71.5 | 69.1 | 68.6 | 64.6 | 69.0 |
| Total amount of solvents: a | 27.5 | 27.5 | 27.5 | 28.0 | 28.5 | 32.5 | 28.0 |
| Amount of solvent satisfying Expression (1): b | 16.5 | 16.5 | 16.5 | 14.0 | 14.0 | 13.0 | 14.0 |
| b/a × 100 (%) | 60.0 | 60.0 | 60.0 | 50.0 | 49.1 | 40.0 | 50.0 |

(*1)Acetylene glycol ethylene oxide adduct (manufactured by Kawaken Fine Chemicals Co., Ltd.)

TABLE 3

| | Light-color magenta ink | | | | | | |
|---|---|---|---|---|---|---|---|
| | 1 | 2 | 3 | 4 | 5 | 6 | 7 |
| Magenta coloring material M1 | 1.5 | 1.0 | 0.09 | 2.0 | 2.0 | 2.0 | 2.1 |
| Ethylene glycol | 9.0 | 9.0 | 9.0 | 10.0 | 10.0 | 9.0 | 10.0 |
| Diethylene glycol | | | | | | | |
| 2-pyrrolidone | 7.5 | 7.5 | 7.5 | 4.0 | 4.0 | 4.0 | 4.0 |
| Urea | | | | 2.0 | 3.0 | 7.5 | 2.0 |
| Glycerin | 11.0 | 11.0 | 11.0 | 12.0 | 11.5 | 12.0 | 12.0 |
| A-E100(*1) | 0.9 | 0.9 | 0.9 | 0.9 | 0.9 | 0.9 | 0.9 |
| Pure water - | 70.1 | 70.6 | 71.5 | 69.1 | 68.6 | 64.6 | 69.0 |
| Total amount of solvents: a | 27.5 | 27.5 | 27.5 | 28.0 | 28.5 | 32.5 | 28.0 |
| Amount of solvent satisfying Expression (1): b | 16.5 | 16.5 | 16.5 | 14.0 | 14.0 | 13.0 | 14.0 |
| b/a × 100 (%) | 60.0 | 60.0 | 60.0 | 50.0 | 49.1 | 40.0 | 50.0 |

(*1)Acetylene glycol ethylene oxide adduct (manufactured by Kawaken Fine Chemicals Co., Ltd.)

<Evaluation>

(1) Humidity Resistance

The resultant yellow inks 1 to 7, light-color cyan inks 1 to 7, and light-color magenta inks 1 to 7 were combined to form an image in which respective inks were superimposed on each other. To be specific, a light-color cyan ink, a yellow ink, and a light-color magenta ink were applied to a recording medium at duties of 50%, 20%, and 80%, respectively, to form an image. An ink jet printer (trade name: PIXUS 950i; manufactured by CANON Inc.) and an ink jet glossy recording medium (trade name: SP101; manufactured by CANON Inc.) were used for creating a recorded article. The resultant recorded article was left in an environment having a temperature of 24° C. and a humidity of 60% for 48 hours. After that, the recorded article was left in an environment having a temperature of 30° C. and a humidity of 80% for 168 hours. A change in color tone of the recorded article after the leaving due to migration was visually observed. The criteria for humidity resistance are as follows. Table 4 shows the evaluation results.

A: No blurring occurs owing to migration.

B: Blurring occurs owing to migration to the extent that no problem arises.

C: Blurring occurs owing to migration to the extent that a slight problem arises.

D: Blurring occurs owing to migration to the extent that a problem arises.

E: Blurring occurs owing to migration to the extent that a remarkable problem arises.

(2) Color Tone (Hue Angle)

The resultant yellow inks 1 to 7 were used to form a solid image. The same ink jet printer as that described above and an ink jet glossy recording medium (trade name: PR101; manufactured by CANON Inc.) were used for creating a recorded article. The resultant recorded article was dried for 24 hours, and then a spectrophotometer (trade name: Spectrolino; manufactured by Gretag Macbeth) was used to measure a hue angle (h). The criteria for color tone are as follows. Table 4 shows the evaluation results.

A: $85 < h < 90$

B: $83 \leq h \leq 85$ or $90 \leq h \leq 92$

C: $h < 83$ or $h > 92$ (3) Granularity (Gradation Representation Performance)

The resultant yellow inks 1 to 7, light-color cyan inks 1 to 7, and light-color magenta inks 1 to 7, and cyan, magenta, and black inks each manufactured by CANON Inc. (trade name: BCI-6) were used to form an image of process black at each gradation from 0 to 100% duty. An ink jet printer (trade name: PIXUS 950i; manufactured by CANON Inc.) and an ink jet glossy recording medium (trade name: PR101; manufactured by CANON Inc.) were used for creating a recorded article. The resultant recorded article was dried for 24 hours, and then the granularity of the recorded article at each duty was visually observed. The criteria for granularity are as follows. Table 4 shows the evaluation results.

A: None of the gradations provides noticeable granular feeling.

B: Slight granular feeling is visually observed at a certain gradation, but causes no problem.

C: Granular feeling is visually observed at a certain gradation, and causes a problem.

TABLE 4

| | | Yellow ink | Light-color cyan ink | Light-color magenta ink | Humidity resistance | Hue angle | Granularity |
|---|---|---|---|---|---|---|---|
| Example | 1 | 1 | 1 | 1 | A | B | A |
| | 2 | 2 | 1 | 1 | A | A | A |
| | 3 | 3 | 1 | 1 | A | B | A |
| | 4 | 4 | 2 | 2 | B | A | A |
| | 5 | 5 | 2 | 2 | B | A | A |
| | 6 | 2 | 4 | 4 | B | A | B |
| Comparative Example | 1 | 4 | 5 | 5 | C | A | B |
| | 2 | 6 | 5 | 5 | C | A | B |
| | 3 | 5 | 6 | 6 | D | A | B |
| | 4 | 6 | 6 | 6 | E | A | B |
| | 5 | 4 | 3 | 3 | C | A | A |
| | 6 | 4 | 7 | 7 | C | A | B |
| | 7 | 7 | 4 | 4 | E | C | B |

As can be seen from Examples 1 to 6 and Comparative Examples 1 to 7 above, when yellow ink is used in combination with the light-color ink having the constitution of the present invention, the humidity resistance of an image formed with the yellow ink increases. In addition, as can be seen from Examples 1 to 6 and Comparative Example 7 above, when the yellow ink having the constitution of the present invention is used in combination with light-color ink, the humidity resistance of an image increases. In addition, when the coloring material concentration of light-color ink is 0.1 mass % or more and 2.0 mass % or less with respect to the total mass of the ink, the granularity of an image causes no problem. However, in the case of light-color ink having a coloring material concentration of 2.1 mass %, a relative difference in granularity is observed, although the granularity causes no problem. In addition, an image formed by means of light-color ink having a coloring material concentration of 0.1 mass % or more and 2.0 mass % or less is excellent in granularity (gradation representation performance), and has better gradation representation performance than that of an image formed by means of light-color ink having a coloring material concentration of 2.1 mass %. In addition, when the compound represented by the general formula (I) and C.I. Direct Yellow 132 are used in combination as coloring materials for yellow ink to be used in combination with light-color ink, performance requested for ink jet ink, and the humidity resistance, color tone (hue angle), and granularity (gradation representation performance) of an image can be simultaneously achieved.

This application claims priority from Japanese Patent Application No. 2004-228229 filed on Aug. 4, 2004 and Japanese Patent Application No. 2005-224242 filed on Aug. 2, 2005, which are hereby incorporated by reference herein.

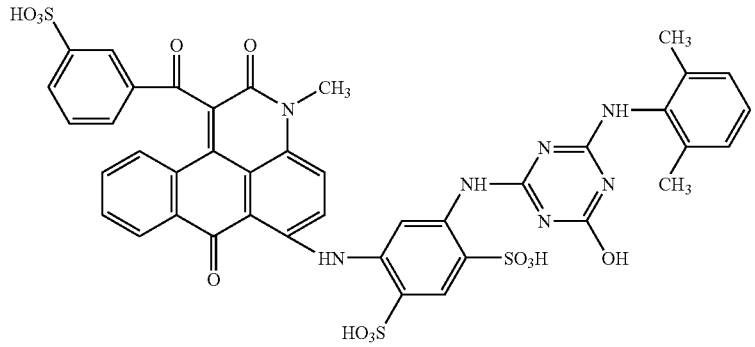

Exemplified Compound 1

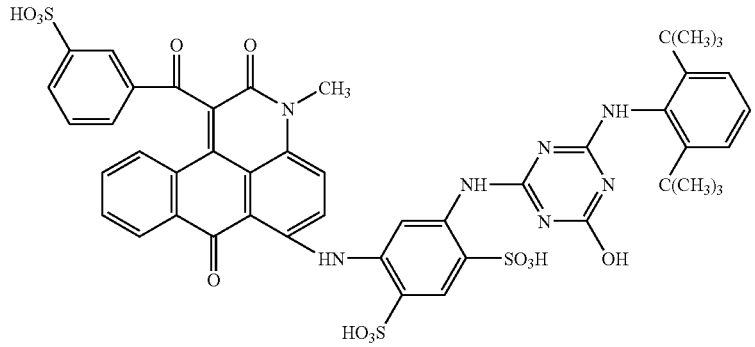

Exemplified Compound 2

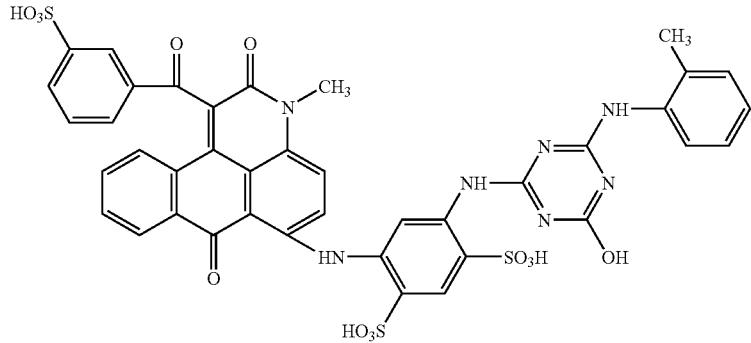

Exemplified Compound 3

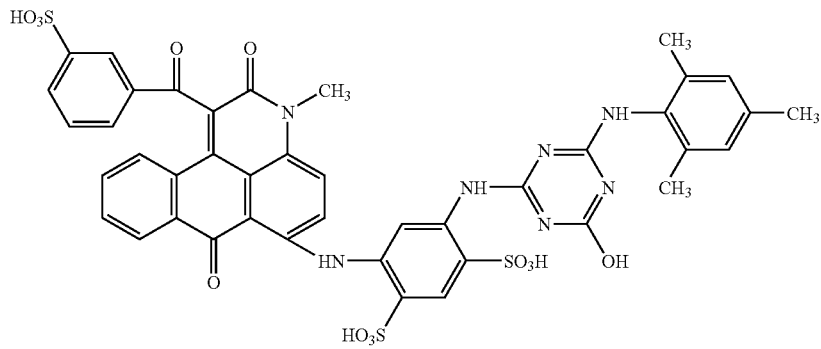

Exemplified Compound 4

-continued

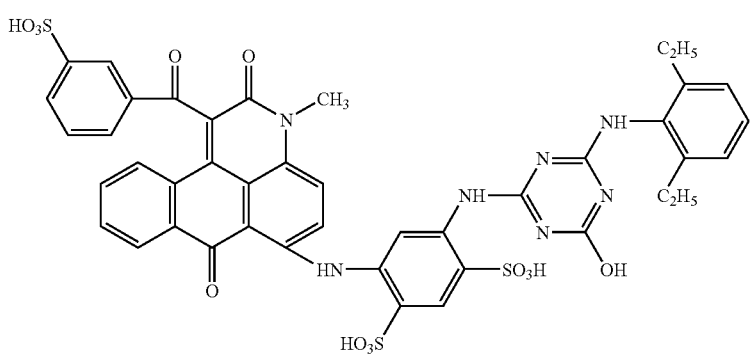

Exemplified Compound 5

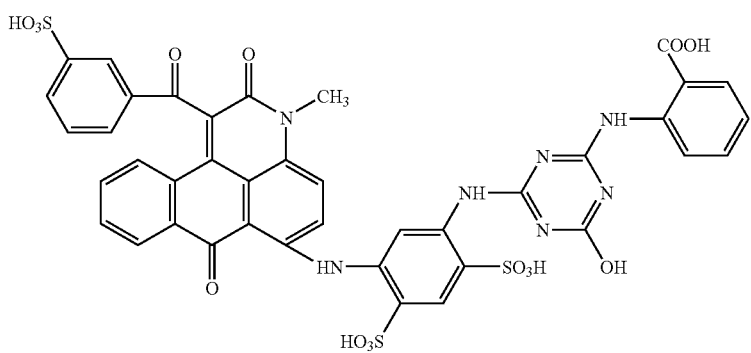

Exemplified Compound 6

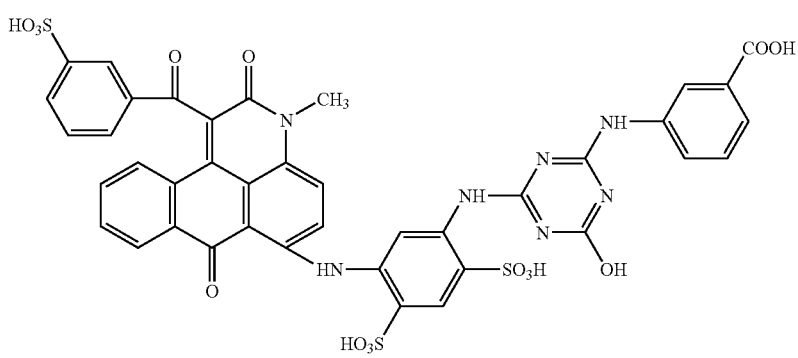

Exemplified Compound 7

What is claimed is:

1. An ink jet yellow ink to be used in combination with an ink jet light-color ink comprising at least a coloring material and a water-soluble organic solvent, wherein a coloring material of the ink jet yellow ink is a compound represented by the following General Formula (I) or a salt thereof; and wherein the ink jet light-color ink satisfies the following conditions (i) and (ii):

(i) a content (mass %) of the coloring material in the ink jet light-color ink is 0.1 mass % or more and 2.0 mass % or less with respect to a total mass of the ink jet light-color ink, and (ii) a total content (mass %) of a water-soluble organic solvent having an evaporation rate X (mass %) and a moisture absorption rate Y (mass %) which satisfy a relationship represented by the following Expression (1) is 50 mass % or more with respect to a total content (mass %) of a water-soluble organic solvent in the ink jet light-color ink;

General Formula (I):

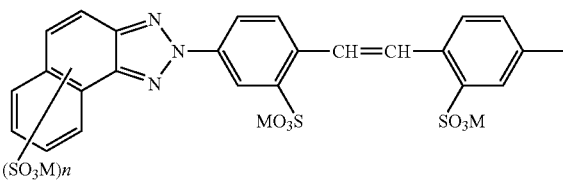

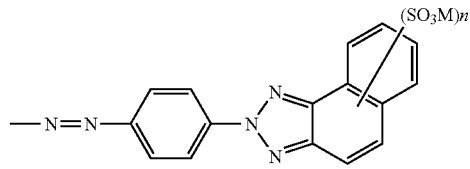

wherein M's each independently represent a hydrogen atom, an alkali metal, an alkali earth metal, a cation of organic amine or an ammonium ion, and n's each independently represent 1 or 2; and $$Y \leq 2.8X+10 \qquad \text{Expression (1).}$$

2. An ink jet yellow ink according to claim 1, wherein the ink jet yellow ink further comprises C.I. Direct Yellow 132 as the coloring material.

3. An ink jet yellow ink according to claim 1, wherein the ink jet light-color ink is a light-color magenta ink.

4. An ink jet yellow ink according to claim 1, wherein the ink jet light-color ink is a light-color cyan ink.

5. An ink jet yellow ink according to claim 1, wherein the ink jet yellow ink further comprises a water-soluble organic solvent, wherein a total content (mass %) of water-soluble organic solvents each having an evaporation rate X (mass %) and a moisture absorption rate Y (mass %) which satisfy the relationship represented by the Expression (1) is 50 mass % or more with respect to a total content (mass %) of water-soluble organic solvents.

6. An ink jet light-color ink comprising at least a coloring material and a water-soluble organic solvent,
wherein the ink jet light-color ink satisfies the following conditions (i) and (ii), and the ink jet light-color ink is used in combination with an ink jet yellow ink comprising a compound represented by the following General Formula (I) or a salt thereof as a coloring material;
(i) a content (mass %) of the coloring material in the ink jet light-color ink is 0.1 mass % or more and 2.0 mass % or less with respect to a total mass of the ink jet light-color ink, and
(ii) a total content (mass %) of a water-soluble organic solvent having an evaporation rate X (mass %) and a moisture absorption rate Y (mass %) which satisfy a relationship represented by the following Expression (1) is 50 mass % or more with respect to a total content (mass %) of a water-soluble organic solvent in the ink jet light-color ink;

wherein M's each independently represent a hydrogen atom, an alkali metal, an alkali earth metal, a cation of organic amine or an ammonium ion, and n's each independently represent 1 or 2; and $$Y \leq 2.8X+10 \qquad \text{Expression (1).}$$

7. An ink jet light-color ink according to claim 6, which is a light-color magenta ink.

8. An ink jet light-color ink according to claim 6, which is a light-color cyan ink.

9. An ink set composed of a plurality of inks, comprising at least an ink jet yellow ink and an ink jet light-color ink,
wherein the ink jet yellow ink comprises at least a coloring material and a water-soluble organic solvent, the coloring material of the ink jet yellow ink is a compound represented by the following General Formula (I) or a salt thereof, the ink jet light-color ink comprises at least a coloring material and a water-soluble organic solvent, and the ink jet light-color ink satisfies the following conditions (i) and (ii):
(i) a content (mass %) of the coloring material in the ink jet light-color ink is 0.1 mass % or more and 2.0 mass % or less with respect to a total mass of the ink jet light-color ink, and
(ii) a total content (mass %) of a water-soluble organic solvent having an evaporation rate X (mass %) and a moisture absorption rate Y (mass %) which satisfy a relationship represented by the following expression (1) is 50 mass % or more with respect to a total content (mass %) of a water-soluble organic solvent in the ink jet light-color ink;

General Formula (I):

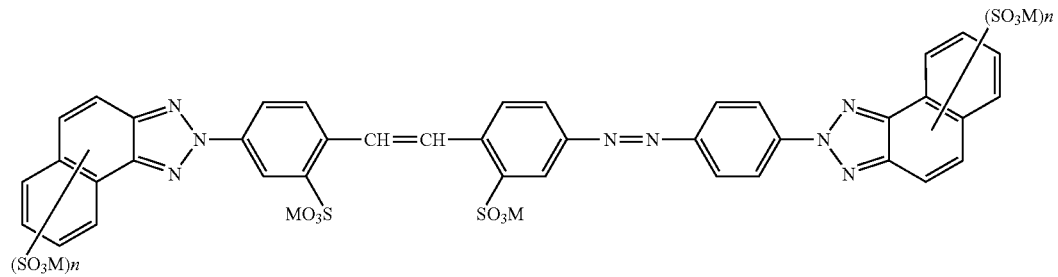

General Formula (I):

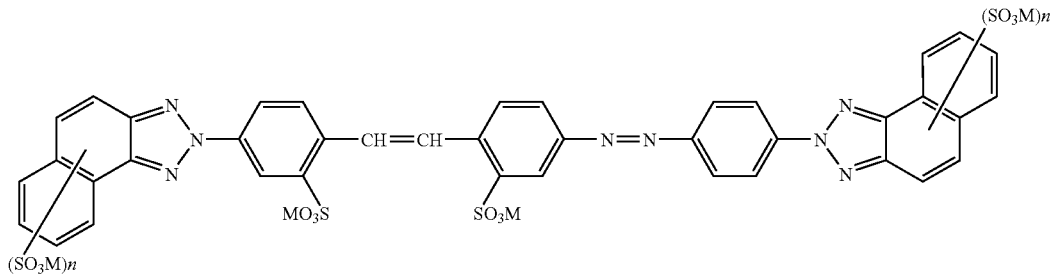

wherein M's each independently represent a hydrogen atom, an alkali metal, an alkali earth metal, a cation of organic amine or an ammonium ion, and n's each independently represent 1 or 2; and $Y \leq 2.8X+10$            Expression (1).

10. An ink jet recording method, comprising ejecting an ink by ink jet method, wherein the ink comprises the ink jet yellow ink according to claim 1.

11. An ink jet recording method, comprising ejecting an ink by ink jet method, wherein the ink comprises the ink jet light-color ink according to claim 6.

12. An ink cartridge, comprising an ink storage portion for storing an ink, wherein the ink comprises the ink jet yellow ink according to claim 1.

13. An ink cartridge, comprising an ink storage portion for storing an ink, wherein the ink comprises the ink jet light-color ink according to claim 6.

14. A recording unit, comprising an ink storage portion for storing an ink and a recording head for ejecting the ink, wherein the ink comprises the ink jet yellow ink according to claim 1.

15. A recording unit, comprising an ink storage portion for storing an ink and a recording head for ejecting the ink, wherein the ink comprises the ink jet light-color ink according to claim 6.

16. An ink jet recording apparatus, comprising an ink storage portion for storing an ink and a recording head for ejecting the ink, wherein the ink comprises the ink jet yellow ink according to claim 1.

17. An ink jet recording apparatus, comprising an ink storage portion for storing an ink and a recording head for ejecting the ink, wherein the ink comprises the ink jet light-color ink according to claim 6.

18. An ink jet light-color ink according to claim 6, wherein the ink jet yellow ink further comprises a water-soluble organic solvent, wherein a total content (mass %) of water-soluble organic solvents each having an evaporation rate X (mass %) and a moisture absorption rate Y (mass %) which satisfy the relationship represented by the Expression (1) is 50 mass % or more with respect to the total content (mass %) of the water-soluble organic solvents.

19. An ink jet yellow ink according to claim 1, wherein the water-soluble organic solvent having an evaporation rate X (mass %) and a moisture absorption rate Y (mass %) which satisfy a relationship represented by the Expression (1) is at least one selected from the group consisting of ethylene glycol, diethylene glycol, 2-pyrrolidone, 1,5-pentanediol, 1,6-hexanediol, and ethylene urea.

20. An ink jet light-color ink according to claim 6, wherein the water-soluble organic solvent having an evaporation rate X (mass %) and a moisture absorption rate Y (mass %) which satisfy a relationship represented by the Expression (1) is at least one selected from the group consisting of ethylene glycol, diethylene glycol, 2-pyrrolidone, 1,5-pentanediol, 1,6-hexanediol, and ethylene urea.

21. An ink set according to claim 9, wherein the water-soluble organic solvent having an evaporation rate X (mass %) and a moisture absorption rate Y (mass %) which satisfy a relationship represented by the Expression (1) is at least one selected from the group consisting of ethylene glycol, diethylene glycol, 2-pyrrolidone, 1,5-pentanediol, 1,6-hexanediol, and ethylene urea.

* * * * *

UNITED STATES PATENT AND TRADEMARK OFFICE
CERTIFICATE OF CORRECTION

PATENT NO. : 7,226,498 B2  Page 1 of 2
APPLICATION NO. : 11/342547
DATED : June 5, 2007
INVENTOR(S) : Tomohiro Yamashita et al.

It is certified that error appears in the above-identified patent and that said Letters Patent is hereby corrected as shown below:

COLUMN 7

Line 11, "aspects" should read --aspect--.

COLUMN 9

Line 17, "hardly-absorbs" should read --hardly absorbs--.

COLUMN 13

Line 19, after "Exemplified Compounds M1 to M7," insert the following:

--
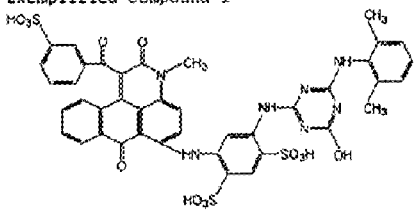
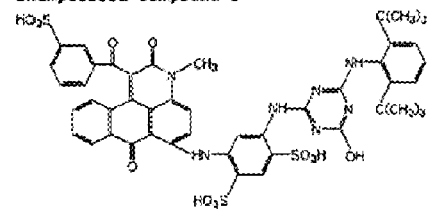
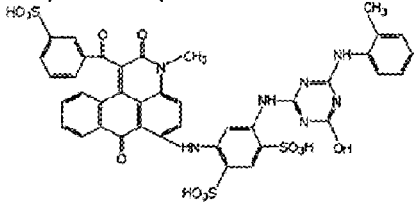
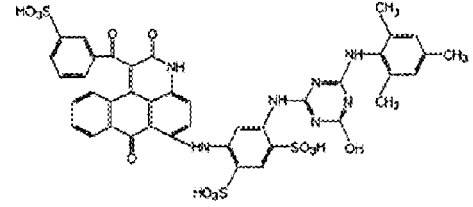
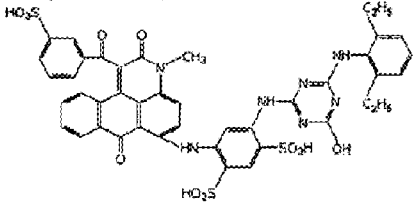
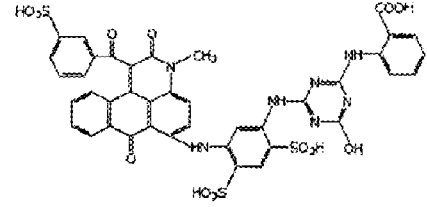
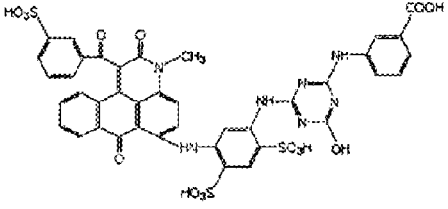
--.

UNITED STATES PATENT AND TRADEMARK OFFICE
CERTIFICATE OF CORRECTION

PATENT NO. : 7,226,498 B2
APPLICATION NO. : 11/342547
DATED : June 5, 2007
INVENTOR(S) : Tomohiro Yamashita et al.

It is certified that error appears in the above-identified patent and that said Letters Patent is hereby corrected as shown below:

COLUMN 17

Line 45, "hydroxyproylmethylcellulose" should read --hydroxypropylmethylcellulose--.

COLUMN 18

Line 14, "mH2O" should read --mH$_2$O--.

Signed and Sealed this

Twentieth Day of May, 2008

JON W. DUDAS
*Director of the United States Patent and Trademark Office*